United States Patent
Ko et al.

(10) Patent No.: US 9,722,812 B2
(45) Date of Patent: *Aug. 1, 2017

(54) SYSTEM AND METHOD OF PROVIDING CONTROL INFORMATION TO DEVICE REGARDING PRODUCT

(71) Applicant: SAMSUNG ELECTRONICS CO., LTD., Suwon-si (KR)

(72) Inventors: Jae-woo Ko, Uiwang-si (KR); Tae-hwan Wi, Suwon-si (KR); Hee-won Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,175

(22) Filed: Jan. 4, 2016

(65) Prior Publication Data

US 2016/0119161 A1    Apr. 28, 2016

Related U.S. Application Data

(63) Continuation of application No. 13/858,145, filed on Apr. 8, 2013, now Pat. No. 9,244,915.

(30) Foreign Application Priority Data

Apr. 7, 2012  (KR) ................ 10-2012-0036406

(51) Int. Cl.
*G06F 17/00* (2006.01)
*G06K 7/00* (2006.01)
(Continued)

(52) U.S. Cl.
CPC ...... *H04L 12/2816* (2013.01); *G05B 19/0426* (2013.01); *G06F 17/30* (2013.01);
(Continued)

(58) Field of Classification Search
CPC .............. H04L 12/2816; H04W 4/008; G05B 19/0426; G06F 17/30; G06K 7/10297; G06K 7/10415
(Continued)

(56) References Cited

U.S. PATENT DOCUMENTS

7,839,298 B2   11/2010 Hardacker et al.
8,820,624 B2   9/2014 Park et al.
(Continued)

FOREIGN PATENT DOCUMENTS

CN    101589272 A    11/2009
CN    101595485 A    12/2009
(Continued)

OTHER PUBLICATIONS

International Search Report dated Jul. 23, 2013, issued by the International Searching Authority in corresponding International Application No. PCT/KR2013/002850.
(Continued)

*Primary Examiner* — Laura Gudorf
(74) *Attorney, Agent, or Firm* — Sughrue Mion, PLLC

(57) ABSTRACT

Controlling a consumer electronic applicant through a mobile terminal to execute functionality appropriate for processing a consumer product is performed by obtaining a device specification of the consumer electronic device and product information on the product to be processed, and generating a command that controls the consumer electronic device to execute the appropriate functionality for processing the product.

5 Claims, 20 Drawing Sheets

(51) Int. Cl.
*G06K 19/06* (2006.01)
*H04Q 5/22* (2006.01)
*H04L 12/28* (2006.01)
*G05B 19/042* (2006.01)
*G06F 17/30* (2006.01)
*G06K 7/10* (2006.01)
*H04W 4/00* (2009.01)

(52) U.S. Cl.
CPC ..... *G06K 7/10297* (2013.01); *G06K 7/10415* (2013.01); *H04W 4/008* (2013.01)

(58) Field of Classification Search
USPC .................. 235/375, 492; 340/13.24–13.26
See application file for complete search history.

(56) References Cited

U.S. PATENT DOCUMENTS

| | | | |
|---|---|---|---|
| 9,012,814 | B2 | 4/2015 | Park et al. |
| 2002/0059175 | A1 | 5/2002 | Nakano |
| 2002/0157411 | A1 | 10/2002 | Ishikawa et al. |
| 2007/0171091 | A1 | 7/2007 | Nisenboim et al. |
| 2008/0094245 | A1* | 4/2008 | Hardacker ............. G05B 15/02 340/4.32 |
| 2008/0236562 | A1 | 10/2008 | Sager et al. |
| 2009/0256708 | A1 | 10/2009 | Hsiao et al. |
| 2009/0276439 | A1* | 11/2009 | Rosenblatt ........ G06F 17/30058 |
| 2010/0082447 | A1* | 4/2010 | Lin .................... G06Q 30/0601 705/26.1 |
| 2010/0123001 | A1 | 5/2010 | Park |
| 2010/0127066 | A1 | 5/2010 | Park et al. |
| 2010/0192784 | A1* | 8/2010 | Shim ....................... F24C 7/082 99/325 |
| 2012/0019674 | A1 | 1/2012 | Ohnishi et al. |

FOREIGN PATENT DOCUMENTS

| | | | |
|---|---|---|---|
| DE | 102005040206 | * | 2/2007 |
| JP | 2002-273089 | A | 9/2002 |
| JP | 2011-024851 | A | 2/2011 |
| KR | 10-2008-0111619 | A | 12/2008 |
| KR | 10-1020211 | B1 | 3/2011 |
| KR | 10-2011-0054814 | A | 5/2011 |

OTHER PUBLICATIONS

Written Opinion dated Jul. 23, 2013, issued by the International Searching Authority in corresponding International Application No. PCT/KR2013/002850.
Communication, Issued by the Australian Patent Office, dated Jun. 24, 2014, in counterpart Australian Application No. 2013203014.
Communication dated Dec. 20, 2016 issued by the State Intellectual Property Office of P.R. China in counterpart Chinese Patent Application No. 201380018534.0.
Communication issued May 31, 2017, by the from the Uropean Patent Office in copending European Application No. 13162610.3.
Darianian et al., "Smart Home Mobile RFID-based Internet-Of-Things Systems and Services", International Conference on Advanced Computer Theory and Engineering, 2008, pp. 116-120.
Riekki et al., "NFC-Based User Interfaces", 4th International Workshop on Near Filed Communication, 2012, pp. 3-9.

* cited by examiner

FIG. 7

| TYPE /70 | MODEL NAME /71 | MANUFACTURER /72 | TARGET PRODUCT /73 | FUNCTION /74 |
|---|---|---|---|---|
| Oven | Ov-12-001 | Samsung | PIZZA, SOUP, STEW, ⋯ | On, off, SELECT MODE, SET TEMPERATURE, SET TIME, PERFORM⋯ |
| washing machine | La-11-M01 | LL | SHIRT, JEANS, SUITS | On, off, SELECT MODE, SET TIME, PERFORM⋯ |
| TV | Tv-11-123 | Samsung | mpg, avi, mkv, jpg, txt, ⋯ | On, off, SELECT APPLICATION, PERFORM, ADJUST REPRODUCTION LOCATION, ADJUST VOLUME, ⋯ |
| ⋮ | ⋮ | ⋮ | ⋮ | ⋮ |

FIG. 8

| TYPE | PRODUCT ID | MANUFACTURER | DEVICE | PROCESSING METHOD |
|---|---|---|---|---|
| PIZZA | Pi-12-001 | M PIZZA | OVEN (Ov-12-001) | TEMPERATURE : 140℃<br>TIME : 3 MINUTES |
| | | | OVEN (Ov-12-002) | TEMPERATURE : 120℃<br>TIME : 4 MINUTES |
| PIZZA | Pi-11-M01 | H PIZZA | OVEN (Ov-12-001) | TEMPERATURE : 125℃<br>TIME : 4 MINUTES |
| 스웨터 | Shi-11-123 | JJ | WASHING MACHINE (La-11-M01) | MODE : WOOL MODE<br>WASHING TIME : 30 MINUTES<br>SPIN-DRY TIME : 5 MINUTES<br>DRYING TEMPERATURE 200℃<br>DRYING TIME : 10 MINUTES |
| ⋮ | ⋮ | ⋮ | ⋮ | ⋮ |

Columns: 80, 81, 82, 83, 84

FIG. 9

| MODEL NAME /90 | MANUFACTURER /91 | CONTROL FUNCTION /92 |
|---|---|---|
| Ov-12-001 | Samsung | On, Off, SELECT MODE, INCREASE COOKING TEMPERATURE, DECREASE COOKING TEMPERATURE, INPUT TEMPERATURE VALUE, INCREASE COOKING TIME, DECREASE COOKING TIME, INPUT COOKING TIME, START COOKING, ⋯ |
| La-11-M01 | LL | On, Off, SELECT MODE, SELECT OPERATION, INCREASE TIME, DECREASE TIME, INPUT TIME, START WASHING, ⋯ |
| ⋮ | ⋮ | ⋮ |

FIG. 10

| PRODUCT ID /10 | DEVICE ID /11 | PROCESSING METHOD /12 | CONTROL OPERATION /13 |
|---|---|---|---|
| Pi-12-001 | OV-12-001 | TEMPERATURE :120°C TIME : 5 MINUTES | 1. On<br>2. INPUT TEMPERATURE VALUE (120°C)<br>3. INPUT COOKING TIME (5 MINUTES)<br>4. START COOKING |
| ⋮ | ⋮ | ⋮ | ⋮ |

FIG. 11

| TYPE /20 | PRODUCT ID /21 | MANUFACTURER /22 | DEVICE /23 | PROCESSING DATE /24 | PROCESSING METHOD /25 | COUNT /26 |
|---|---|---|---|---|---|---|
| PIZZA | Pi-12-001 | M PIZZA | OVEN(Ov-12-001) | 2012-03-20, 2012-03-23 | TEMPERATURE: 140°C TIME: 3 MINUTES | 2 |
| PIZZA | Pi-12-001 | M PIZZA | OVEN(Ov-12-001) | 2012-03-25 | TEMPERATURE: 120°C TIME: 5 MINUTES | 1 |
| ... | ... | ... | ... | ... | ... | ... |

FIG. 14

PRODUCT NAME : PIZZA
DEVICE NAME : OVEN

| COOKING METHOD | NUMBER OF TIMES | SELECT |
|---|---|---|
| 140° 3 MINUTES | 2 | ☐ — 50 |
| 120° 5 MINUTES | 1 | ☐ |
| CHANGE | – | ☐ — 52 |

<SELECT COOKING METHOD>

SYSTEM AND METHOD OF PROVIDING CONTROL INFORMATION TO DEVICE REGARDING PRODUCT

CROSS-REFERENCE TO RELATED PATENT APPLICATIONS

This application is a Continuation Application of U.S. patent application Ser. No. 13/858,145, filed Apr. 8, 2013, in the U.S. Patent and Trademark Office, which claims priority from Korean Patent Application No. 10-2012-0036406, filed on Apr. 7, 2012, in the Korean Intellectual Property Office, the disclosures of which are herein incorporated by reference in their entireties.

BACKGROUND

1. Field

Exemplary embodiments relate to a system and method of generating control information according to device information and product information, and providing the generated control information to a device.

2. Description of the Related Art

Recently, the number of devices for processing products has increased. A user has to decide a method of processing a product, for example, cook, wash, or reproduce an item of food, an item of clothing, or content. Also, the user has to know how to manipulate the devices for processing the product using the selected method. Such inconveniences for the user are further intensified as types of products and methods of processing the products vary, and functions of devices become increasingly complex. Accordingly, it is required to effectively generate and manage control information of a device regarding a predetermined product.

SUMMARY

One or more exemplary embodiments provide a system and method of providing control information to a device regarding a product, wherein the control information for processing the product is obtained by using device information and product information.

According to an aspect of an exemplary embodiment, there is provided a method of controlling a consumer electronic appliance through a mobile terminal, the method including: receiving device information of the consumer electronic appliance at the terminal, the device information comprising at least one of an identifier of the consumer electronic appliance and an operational capability of the consumer electronic appliance; receiving product information of the product at the terminal, the product information comprising at least one of an identifier of the product, processing information for the product, and a property of the product; obtaining a command that controls the consumer electronic appliance to perform a process on the product based on the device information and the product information; and providing the command to the consumer electronic appliance for causing the consumer electronic appliance to perform the process on the product.

The receiving device information may include receiving the device information using near field communication (NFC) between the terminal and the consumer electronic appliance, and the receiving product information may include receiving the product information using NFC communication between the terminal and the product.

The receiving device information may include receiving the device information from an NFC tag of the consumer electronic appliance, and the receiving product information may include receiving the product information from an NFC tag of the product.

The device information may be NFC formatted data and the product information may be NFC formatted data.

The providing may include providing the command to the consumer electronic appliance using NFC.

The command may be NFC formatted data.

The obtaining may include transmitting the device information and the product information to a server and receiving the command from the server.

The receiving the command may include receiving the command from the server as extensible markup language (XML) formatted data and converting the command from XML format to NFC format.

The obtaining may further include determining the process to be performed on the product by the consumer electronic appliance based on the device information and the product information, and the transmitting may include transmitting comprises transmitting the device information, the product information, and the process to the server.

The obtaining may include determining the process to be performed on the product by the consumer electronic appliance based on the device information and the product information and generating the command based on the process and the device information.

The consumer electronic appliance may be a first consumer electronic device and a second consumer electronic device, and the receiving device information may include receiving first device information of the first consumer electronic device, receiving second device information of the second consumer electronic device, selecting one of the first consumer electronic device and the second consumer electronic device as a selected consumer electronic device based on the first device information, the second device information, and the product information, and selecting one of the first device information and the second device information of the selected consumer electronic device as the device information.

The consumer electronic appliance may include a first consumer electronic device and a second consumer electronic device and the receiving device information may include receiving first device information of the first consumer electronic device; receiving second device information of the second consumer electronic device; displaying a list of the first consumer electronic device and the second consumer electronic device; receiving an input selecting one of the first consumer electronic device and the second consumer electronic device in the list as the selected consumer electronic device; and selecting one of the first device information and the second device information of the selected consumer electronic device as the device information.

The product may be a first product and a second product, and the receiving product information may include receiving first product information of the first product, receiving second product information of the second product, selecting one of the first product and the second product as a selected product based on the first product information, the second product information, and the device information, and selecting one of the first product information and the second product information of the selected product as the product information.

The product may be a first product and a second product, and the receiving product information may include receiving first product information of the first product; receiving second product information of the second product; selecting one of the first product and the second product as a selected product based on the first product information, the second product information, and the device information; and selecting one of the first product information and the second product information of the selected product as the product information.

According to another aspect of an exemplary embodiment, there is provided a mobile terminal including: a memory for storing at least one a program that causes the mobile terminal to execute a method of controlling a consumer electronic appliance through the mobile terminal; and a processor that executes the program, wherein the at least one program comprises commands that control the mobile terminal to execute: receiving device information of the consumer electronic appliance at the terminal, the device information comprising at least one of an identifier of the consumer electronic appliance and an operational capability of the consumer electronic appliance; receiving product information of the product at the terminal, the product information comprising at least one of an identifier of the product, a process to be performed on the product, and a property of the product obtaining an operational command that controls the consumer electronic appliance to execute an operational process on the product based on the device information and the product information; and providing the operational command to the consumer electronic appliance for causing the consumer electronic appliance to perform the operational process on the product.

According to an aspect of an exemplary embodiment, there is provided a non-transitory computer-readable medium having embodied thereon a program for controlling a consumer electronic appliance through the mobile terminal, the method including receiving device information of the consumer electronic appliance at the terminal, the device information comprising at least one of an identifier of the consumer electronic appliance and an operational capability of the consumer electronic appliance, receiving product information of the product at the terminal, the product information comprising at least one of an identifier of the product, a process to be performed on the product, and a property of the product, obtaining an operational command that controls the consumer electronic appliance to execute an operational process on the product based on the device information and the product information, and providing the operational command to the consumer electronic appliance for causing the consumer electronic appliance to perform the operational process on the product.

BRIEF DESCRIPTION OF THE DRAWINGS

The above and other aspects will become more apparent by describing in detail exemplary embodiments thereof with reference to the attached drawings in which:

FIG. 7 is a table showing device information according to an exemplary embodiment;

FIG. 8 is a table showing product information according to an exemplary embodiment;

FIG. 9 is a table showing control functions matched according to devices, according to an exemplary embodiment;

FIG. 10 is a table showing control information for realizing a predetermined processing method, according to an exemplary embodiment;

FIG. 11 is a table showing information about a control history matched to a product and a device, and stored in a mobile terminal, according to an exemplary embodiment;

FIG. 14 is a diagram of a selection list for selecting a processing method for processing a product, according to an exemplary embodiment;

DETAILED DESCRIPTION OF THE EXEMPLARY EMBODIMENTS

Figure 1:
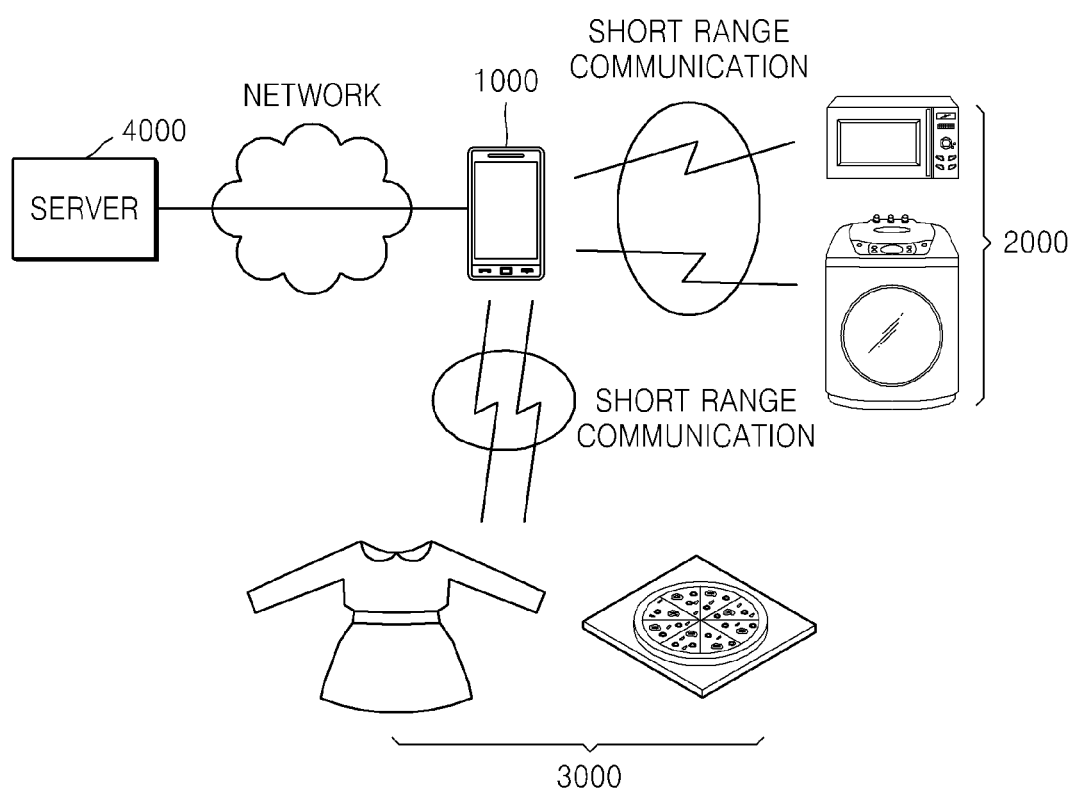
FIG. 1 is a schematic diagram of a system for providing control information of a device regarding a product, according to an exemplary embodiment.

Hereinafter, exemplary embodiments will be described more fully with reference to the accompanying drawings, in which the exemplary embodiments are shown. The exemplary embodiments may, however, be embodied in many different forms and should not be construed as being limited to the exemplary embodiments set forth herein; rather, these exemplary embodiments are provided so that this disclosure will be thorough and complete, and will fully convey the concept of the disclosure to those of ordinary skill in the art. In the drawings, elements irrelevant to the description are not illustrated for clarity of description, and like reference numerals denote like elements.

It will be understood that when a component is "connected" to another component, it may be "directly connected" to the other component, or "electrically connected" via an intervening component. Also, when a unit "includes" or "comprises" a component, the unit may further include another component unless otherwise defined.

As used herein, the term "and/or" includes any and all combinations of one or more of the associated listed items. Expressions such as "at least one of," when preceding a list of elements, modify the entire list of elements and do not modify the individual elements of the list.

Device information may be one or more of information for identifying a device and determining an attribute of the device, and may include at least one of an identification value of the device, a product matched with the device, a function provided by the device, a control command used in the device, and a link address for downloading the device information.

Also, product information may be one or more of information for identifying a product and determining an attribute of the product, and may include at least one of an identification value of the product, an attribute or property of the product, a type of the product, a manufacturer of the product, an identification value of a device regarding the product, a processing method of the product, and a link address for downloading the product information. Examples of the processing method may include washing clothes, cooking foods, and executing contents, but are not limited thereto.

One or more exemplary embodiments will now be described in detail with reference to accompanying drawings.

FIG. 1 is a schematic diagram of a system for providing control information of a device regarding a product, according to an exemplary embodiment.

As shown in FIG. 1, the system according to the exemplary embodiment includes a mobile terminal 1000, at least one device 2000, at least one product 3000, and a server 4000.

The mobile terminal 1000 may obtain control information of the device 2000 for processing the product 3000, and provide the obtained control information to the device 2000, by using device information and product information. The mobile terminal is preferably a portable handheld user terminal, such as a smartphone, but may include other devices such as laptops, personal digital assistants, and the like. The mobile terminal 1000 may generate control information by using device information of the device 2000 and product information of the product 3000, but alternatively, the mobile terminal 1000 may provide the device information and the product information to the server 4000, which generates the control information, and receive the control information from the server 4000. Then, the mobile terminal 1000 may provide the control information to the device 2000.

The device 2000 provides the device information of the device 2000 to the mobile terminal 1000, and receives the control information for processing the product 3000 from the mobile terminal 1000. Also, the device 2000 performs an operation based on the received control information to process the product 3000. Examples of the device 2000 include all types of devices capable of communicating with the mobile terminal 1000 and capable of receiving the control information from the mobile terminal 1000. Examples the device 2000 may be a washing machine, an oven, a refrigerator, a TV, etc., but are not limited thereto.

The product 3000 provides the product information to the device 2000. In detail, predetermined product information may be provided to the device 2000, from a tag of the product 3000. The tag may be attached to or included in the product 3000. Alternatively, the tag may be attached to or included in a packaging of the product 3000. Examples of the product 3000 that is to be processed through the device 2000 include clothes, foods, and contents, but are not limited thereto. Also, the product information may be provided to the mobile terminal 1000 from a separate apparatus (not shown) instead of the product 3000.

The server 4000 receives the device information and the product information from the mobile terminal 1000, and generates the control information of the device 2000 for processing the product 3000. The server 4000 may generate the control information by checking a processing method of the product 3000 obtained from the product information, and determining control commands of operations of the device 2000 for performing the processing method on the product 3000. Also, the server 4000 may provide the generated control information to the mobile terminal 1000 or the device 2000.

A method of providing the control information for processing the product 3000 from the mobile terminal 1000 or the server 4000 to the device 2000 in the system will be described in detail later with reference to FIGS. 3 through 6.

Figure 2:
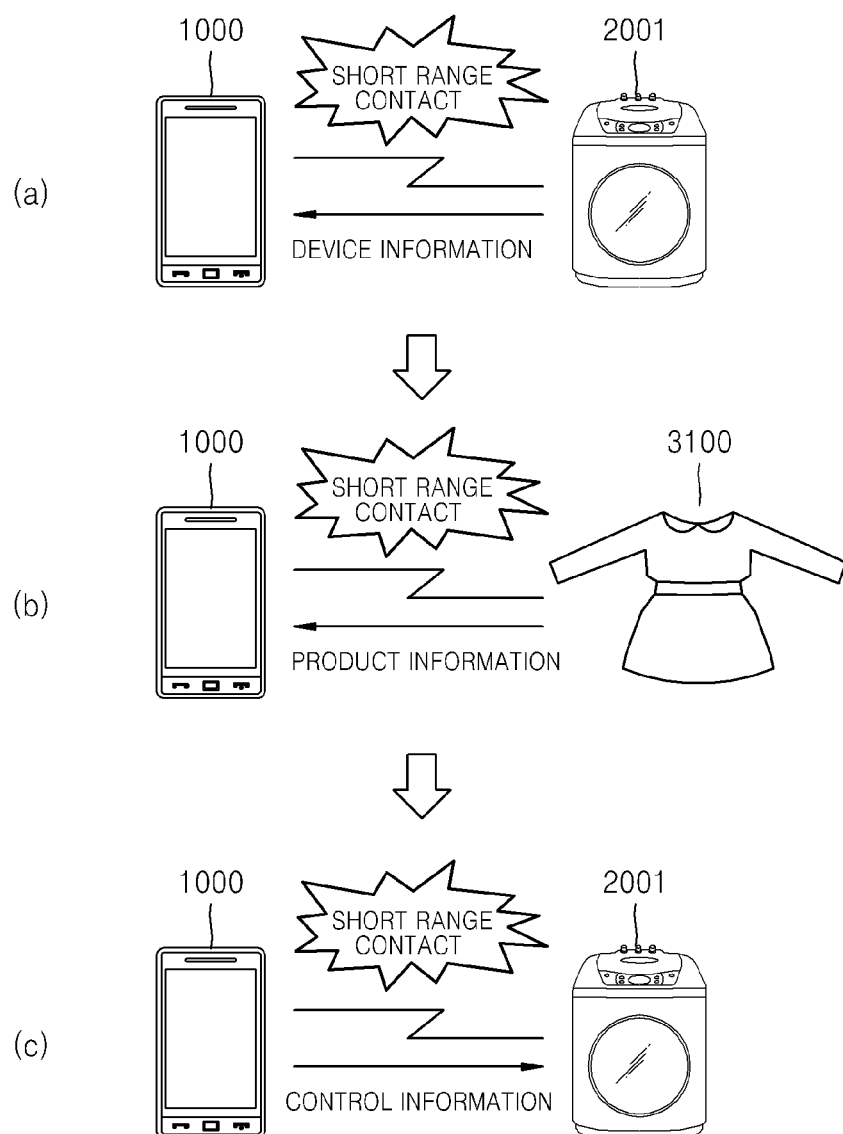
FIG. 2 is a diagram for describing a mobile terminal respectively collecting device information and product information from a washing machine and a sweater, and providing control information of the washing machine regarding the sweater to the washing machine, according to an exemplary embodiment.

FIG. 2 is a diagram for describing the mobile terminal 1000 respectively collecting device information and product information from a washing machine 2001 and a sweater 3100, and providing control information for processing the sweater 3100, according to product information of the sweater 3100, to the washing machine 2001, according to an exemplary embodiment. In this regard, the washing machine 2001 is provided with a process for washing the sweater 3100 according to available functions of the washing machine 2001 and product information sweater 3100.

Referring to FIG. 2 (a), when the mobile terminal 1000 is within a predetermined distance from the washing machine 2001, the washing machine 2001 transmits device information of the washing machine 2001 to the mobile terminal 1000. For example, the device information of the washing machine 2001 may be provided to the mobile terminal 1000 from a near field communication (NFC) tag attached to the washing machine 2001. Here, the device information may include a model name of the washing machine 2001, a type of the washing machine 2001, a product that can be washed by the washing machine 2001, a function provided by the washing machine 2001, a control command used in the washing machine 2001, and a link address (uniform resource locator, etc.) for obtaining the device information. The device information stored in the NFC tag of the washing machine 2001 may be formatted for transmission over NFC.

Also, referring to FIG. 2B, when the mobile terminal 1000 is within a predetermined distance from the sweater 3100, the sweater 3100 transmits product information of the sweater 3100 to the mobile terminal 1000. For example, the product information of the sweater 3100 may be transmitted to the mobile terminal 1000 from an NFC tag attached to or included in the sweater 3100. Here, the product information may include at least one of a model name of the sweater 3100, a type of the sweater 3100, a manufacturer of the sweater 3100, an identification value of washing machines able to wash the sweater 3100, a method of washing the sweater 3100, and a link address for obtaining the product information. The product information stored in the NFC tag of the sweater 3100 may be formatted for transmission over NFC.

Also, referring to FIG. 2C, the mobile terminal 1000 provides control information to the washing machine 2001 for washing the sweater 3100 according to functions available to the washing machine 2001 obtained from the device information and properties of or constraints for washing the sweater 3100 obtained from the product information. The mobile terminal 1000 may transmit the control information to the washing machine 2001 via short range communication after obtaining the control information based on the device information and the product information. Accordingly, the control information may be formatted for transmission over NFC. When the mobile terminal 1000 directly generates the control information based on the device information and the product information, the mobile terminal 1000 may check operations of the washing machine 2001 for washing the sweater 3100 from the product information and the device information, and generate the control information using control commands of the washing machine 2001 corresponding to functions of the washing machine 2001 based on the properties of or constraints for washing the sweater 3100 obtained from the product information. Alternatively, the mobile terminal 1000 may relay the device information and the product information to the server 4000, receive control information generated by the server 4000, and provide the control information to the washing machine 2001.

Figure 3:
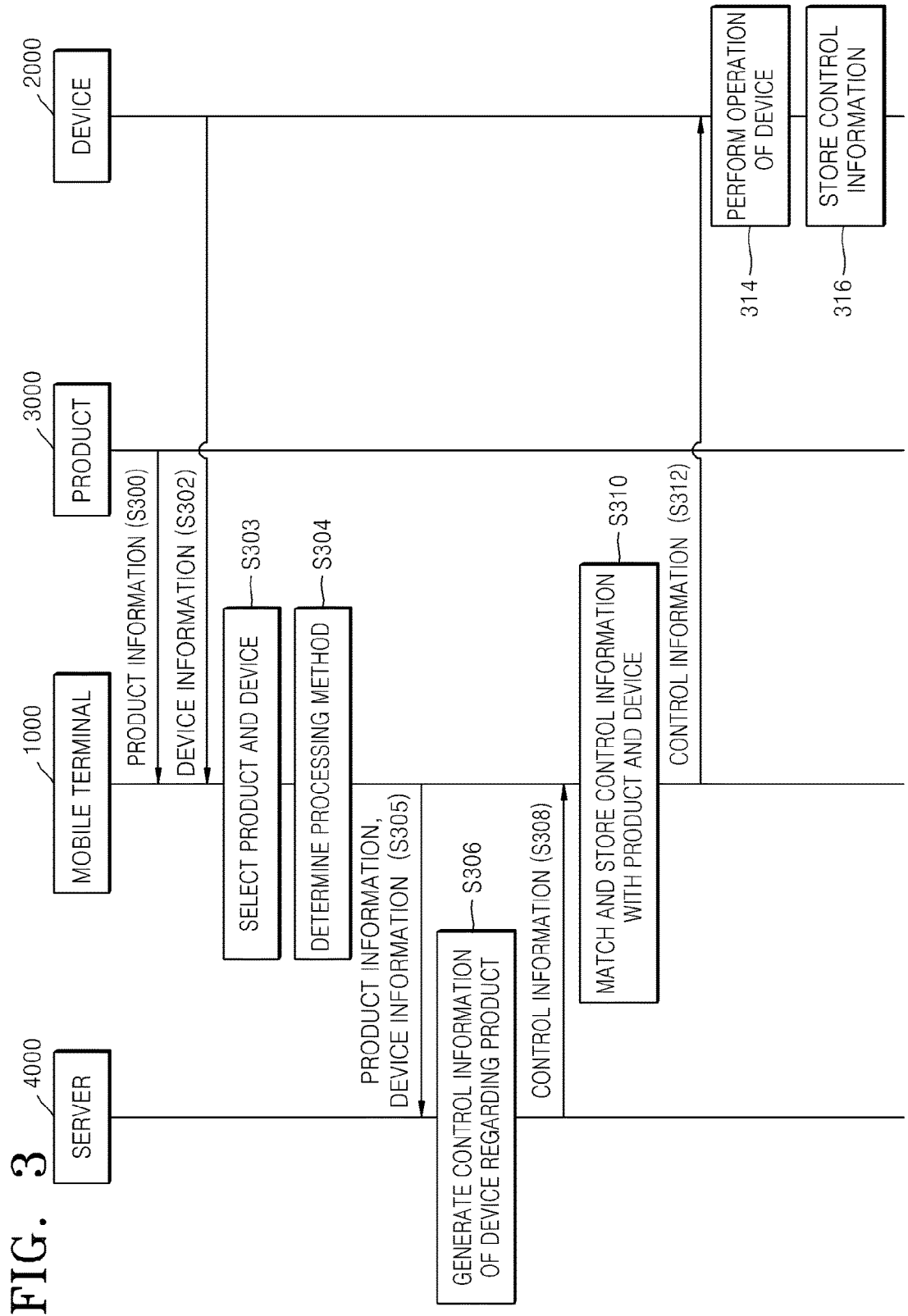
FIG. 3 is a diagram for describing a mobile terminal receiving control information corresponding to a device and a product from a server, and providing the control information to the device, according to an exemplary embodiment.

FIG. 3 is a diagram for describing the mobile terminal 1000 receiving the control information of the device 2000 for processing the product 3000 from the server 4000, and providing the control information to the device 2000, according to an exemplary embodiment.

In operation S300, the mobile terminal 1000 receives the product information from the product 3000. In operation S300, the mobile terminal 1000 may receive the product information via short range communication, from the tag of the product 3000. For example, the product information may be formatted and transmitted over NFC. The tag of the product 3000 may be included in or attached to the product 3000 or may be attached to the packaging of the product 3000, but is not limited thereto. When the mobile terminal 1000 is within a predetermined range of the tag, the mobile terminal 1000 may receive the product information from the tag. The mobile terminal 1000 may receive the product information from the tag of the product 3000, via NFC. Alternatively, the mobile terminal 1000 may receive the product information from a separate apparatus (not shown). Also, for example, when the product 3000 is a pizza, the product information may include at least one of a model name of the pizza, a type of the pizza, a manufacturer of the pizza, an identification devices suitable for cooking the pizza, a cooking method of the pizza, and a link address for obtaining the product information or additional information about the pizza.

The mobile terminal 1000 may receive link information for downloading the product information, and in this case, the mobile terminal 1000 may receive the product information from a predetermined server (not shown) over a communication network using the link information.

Also, in operation S300, the mobile terminal 1000 may register and store the received product information. The mobile terminal 1000 may store the product information in association with a time at which the product information was obtained and location information indicating a location of the mobile terminal 1000 and/or product 3000 when the product information was obtained, but is not limited thereto. The mobile terminal may store the product information as NFC formatted data, or may convert the product information to a standard language format, such as XML format, and store the XML formatted product information.

In operation S302, the mobile terminal 1000 receives the device information from the device 2000. When the mobile terminal 1000 is within a predetermined range from the device 2000, the mobile terminal 1000 may receive the device information from the device 2000 via short range communication. For example, the device information may be formatted and transmitted over NFC. When a user maneuvers the mobile terminal 1000 close to the device 2000, the mobile terminal 1000 may receive the device information from the device 2000 via NFC. Also, for example, when the device 2000 is an oven, the device information may include at least one of a model name of the oven, a product cooked by the oven, a function provided by the oven, a control command used in the oven, and a link address for obtaining information about the oven. Also, the control command used in the device 2000 may be separately provided to the mobile terminal 1000 based on a request of the mobile terminal 1000. For example, if the mobile terminal 1000 has never controlled the device 2000, the mobile terminal 1000 may request the device 2000 for the control command. Alternatively, the control command used in the device 2000 may be provided in the mobile terminal 1000 in response to a request of the device 2000.

The received device information may be stored in the mobile terminal 1000. For example, the mobile terminal 1000 may register and store the device information about home appliances, such as a washing machine, a dryer, an oven, a toaster, and a TV. The mobile terminal may store the device information as NFC formatted data, or may convert the device information to a standard language format, such as XML format, and store the XML formatted device information.

Also, the registered device information may be used for the mobile terminal 1000 to select a device for processing the product 3000, when the mobile terminal 1000 receives the product information from the product 3000. For example, when the mobile terminal 1000 receives product information from a pizza, the mobile terminal 1000 may choose an oven or a toaster as the device 2000 for cooking the pizza. In detail, the mobile terminal 1000 may check an identification value of a product cooked by the oven and an identification value of a product cooked by the toaster from the device information of the oven and the toaster. Also, the mobile terminal 1000 may check an identification value of a device for cooking the pizza from the product information. Then, the mobile terminal 1000 may choose the oven or the toaster as the device 2000 for cooking the pizza, based on the identification values. Alternatively, the mobile terminal 1000 may display a selection list for selecting at least one of the oven and the toaster, and choose the oven as the device 2000 for cooking the pizza based on a user input from among the devices in the selection list.

Alternatively, in operation S302, the mobile terminal 1000 may receive link information for downloading the device information from the device 2000, and receive the device information from a predetermined server (not shown) over a communication network using the received link information.

In operation S303, the mobile terminal 1000 selects the product 3000 and the device 2000.

The mobile terminal 1000 may display at least one list of product information, and select a predetermined product based on a user input selecting one of the products in the list of product information. The mobile terminal 1000 may display the list by grouping related products. For example, a pizza, a soup, and a stew may be grouped in a 'food' category, and a shirt, a sweater, and pants may be grouped in a 'clothes' category, but the grouping of related products is not limited thereto. Also, the list of the product information may be distinguished according to a time at which the product information is acquired and a location of the mobile terminal 1000 when product information is acquired. If the device 2000 is selected first, a list of product information related to the selected device 2000 may be displayed. For example, if an oven is selected, a list of a pizza, a soup, and a stew related to the oven may be displayed.

If a product desired by the user is not in the list of the product information, the user may bring the mobile terminal 1000 within communication range of the desired product so that the mobile terminal 1000 receives the product information of the desired product. Also, if the device 2000 is selected first, the mobile terminal 1000 may receive the product information within a predetermined time after the device 2000 is selected and select the product information if the product information is acquired within the predetermined time after the device 2000 is selected.

Also, the mobile terminal 1000 may display a list of registered device information, and select a predetermined device based on a user input. The mobile terminal may display the list by grouping related devices. For example, an oven, a toaster, and a gas stove may be grouped in a 'cooking appliance' category, but the grouping of related devices is not limited thereto. Also, the list of the device information may be distinguished according to time at which the device information is acquired and location of the mobile terminal 1000 when the device information is acquired. If the product 3000 is selected first, a list of devices related to the selected product 3000 may be displayed. For example, if a pizza is selected, a list of an oven and a toaster suitable for cooking the pizza may be displayed.

If a device desired by the user is not in the list of the device information, the user may bring the mobile terminal 1000 within communication range of the desired device so that the mobile terminal 1000 receives the device information of the desired device. Also, if the product 3000 is selected first, the mobile terminal 1000 may receive the device information within a predetermined time after the product 3000 is selected and select the device information if the device information is acquired within the predetermined time after the product 3000 is selected.

In operation S304, the mobile terminal 1000 determines a processing method for processing the product 3000. In operation S304, the mobile terminal 1000 may display a list of processing methods for processing the selected product 3000 through the selected device 2000. For example, if an oven and a pizza are selected, a list of cooking methods may include a first cooking method (heat for 3 minutes at 140° C.) and a second cooking method (heat for 4 minutes at 120° C.), and the list of cooking methods may be displayed.

The list of processing methods may be generated based on a preference of the user. A history of processing methods selected by the user may be accumulated by the mobile terminal 1000 and stored in the mobile terminal 1000, and the user's preference for processing a product may be determined based on the history. For example, for a food preparation method, it may be determined whether the user prefers food well-done or rare. Also, a recommendation list of cooking methods may be displayed based on such preferences.

Alternatively, the list of processing methods may be generated based on a preference of another user. The other user may be a friend of the user of the mobile terminal 1000 or may have a similar taste as the user. Information about a processing history of the other user may be provided to the mobile terminal 1000 from a separate server (not shown), and the mobile terminal 1000 may generate the list of processing methods based on the history of the different user.

Also, in operation S304, the mobile terminal 1000 may determine the processing method through a social network service (SNS). For example, the mobile terminal 1000 may transmit information about the selected product 3000 and the selected device 2000 to a predetermined SNS server (not shown) or a terminal (not shown) of another user using an SNS. Also, the mobile terminal 1000 may receive a comment of another user about a processing method of the selected product 3000 from the SNS server or the terminal of the other user. Accordingly, the user may refer to comments of other users to determine the method of processing the selected product 3000, and transmit information about the processing method to the mobile terminal 1000.

In operation S305, the mobile terminal 1000 provides the device information, the product information, and processing information of the processing method to the server 4000. The mobile terminal may provide the device information, the product information, and processing information of the processing method to the server 4000 as NFC formatted data, or may provide the information to the server 4000 as XML formatted data. For example, the mobile terminal 1000 may provide device information of an oven and product information of a pizza to the server 4000. Here, the mobile terminal 1000 may provide at least one of a model name of the oven, a function provided by the oven, and a command used to control the oven, from among the device information about the oven, but information provided by the mobile terminal 1000 is not limited thereto. Also, the mobile terminal 1000 may provide at least one of a model name of the pizza, a manufacturer of the pizza, and a cooking method of the pizza, from among the product information of the pizza, but product information provided by the mobile terminal 1000 is not limited thereto. Also, the mobile terminal 1000 may provide the server 4000 with processing information of a method of cooking the pizza using the oven. For example, the mobile terminal 1000 may provide the server 4000 with a temperature value and a time value for cooking the pizza in the oven.

In operation S306, the server 4000 generates the control information of the device 2000 for processing the product 3000. In operation S306, the server 4000 may generate the control information of the device 2000 for processing the product 3000 according to the processing method using the device information, the product information, and the processing information of the processing method. The server may check the processing method of the product 3000 against a stored database of information formatted according to NFC, XML, or any other format, and select a function to be executed in the device 2000 based on the processing method and the device information. Alternatively, the control information may be generated by combining control commands of a selected function. At this time, the control commands may be arranged according to a predetermined order. For example, the server 4000 may check the temperature setting value and the time setting value for cooking the pizza. Also, the server 4000 may extract control commands for setting a temperature and a cooking time of the oven according to the temperature value and time value, from the device information of the oven. Alternatively, the server 4000 may generate the control information by sequentially arranging a control command for activating the oven, a control command for setting a temperature of the oven, a control command for setting a cooking time of the oven, and a control command for executing a cooking function (bake, broil, etc.) of the oven. Alternatively, the server 4000 may receive information about the user's preference from the mobile terminal 1000, determine a processing method based on the preference, and generate the control information.

In operation S308, the server 4000 transmits the control information to the mobile terminal 1000. The server 4000 may provide the identification value of the device 2000 and the identification value of the product 3000, along with the control information generated in operation S306, to the mobile terminal 1000. For example, the server 4000 may provide a model name of the pizza and a model name of the oven to the mobile terminal 1000, along with the control command of the oven for cooking the pizza. The server 4000 may transmit the control information and control commands to the mobile terminal as NFC formatted data, or may provide the control information and control commands to the mobile terminal as XML formatted data.

Operation S304 may be omitted in FIG. 3. In this case, the mobile terminal 1000 may provide the product information and the device information and receive a control command for processing the product 3000 from the server 4000, in operations S305 and S308. Here, the server 4000 may generate control information according to a pre-determined processing method matched to the product 3000 and the device 2000, and provide the control information to the mobile terminal 1000. Alternatively, the server 4000 may receive the information about the user's preference from the mobile terminal 1000, determine a processing method based on the preference, and generate control information.

In operation S310, the mobile terminal 1000 stores the control information in association with the product 3000 and the device 2000. The mobile terminal 1000 may associate the control information with a combination of the product 3000 and the device 2000, and store the associated information in a table, index, database, or the like. Alternatively, the mobile terminal 1000 may store a type, manufacturer, processing date, and method of processing the product 3000 together with the associated information, and count information indicating a number of times the device 2000 is controlled according to processing methods of the product 3000. For example, the mobile terminal 1000 may store a model name of the pizza, the model name of the oven, and a method (for example, a cooking method at temperature: 140° C., for time: 3 minutes) of cooking the pizza in the oven, and may also store dates when the pizza was cooked and a number of times the cooking method is used. However, alternatively, the mobile terminal 1000 may store a user evaluation score according to processing methods. Here, the user evaluation score denotes a score rated by a user regarding a result of processing a product according to a processing method.

Also, the matched information stored in operation S310 may be used to determine the preference of the user from the user's history, and may be used by the mobile terminal 1000 to recommend a processing method for processing the product 3000.

In operation S312, the mobile terminal 1000 provides the control information to the device 2000.

In operation S312, when the mobile terminal 1000 is within communication range of the device 2000, the mobile terminal 1000 may transmit the control information to the device 2000 via short range communication. If the mobile terminal 1000 stores the control information in NFC format, the mobile terminal 1000 provides the control information as NFC formatted data over NFC. If the mobile terminal 1000 stores the control information in another format, such as XML, the mobile terminal converts the control information to NFC format and the mobile terminal 1000 transmits the control information as NFC formatted data using NFC to the device 2000. For example, when the mobile terminal 1000 selects a processing method for processing the product 3000 and approaches the device 2000 within a predetermined time of selecting the processing method, the mobile terminal 1000 may provide control information corresponding to the processing method to the device 2000.

Also, when the mobile terminal 1000 approaches the device 2000 within the predetermined time, the mobile terminal 1000 may provide the control information to the device 2000. For example, when the mobile terminal 1000 approaches the device 2000 within a predetermined time after the mobile terminal 1000 selects at least one of the product 3000 and the device 2000, the control information may be transmitted to the device 2000 from the mobile terminal 1000.

In operation S314, the device 2000 performs an operation of the device 2000 based on the received control information. The device 2000 may process the product 3000 according to a predetermined method by sequentially performing the control commands included in the control information.

Also, in operation S316, the device 2000 may store the control information. The device 2000 may store the control information after performing the operation based on the control information. Then, when the device 2000 and the product 3000 are within communication range of each other, the device 2000 may receive the product information from the product 3000 and perform the operation of the device 2000 based on the received product information and the stored control information.

Figure 4:
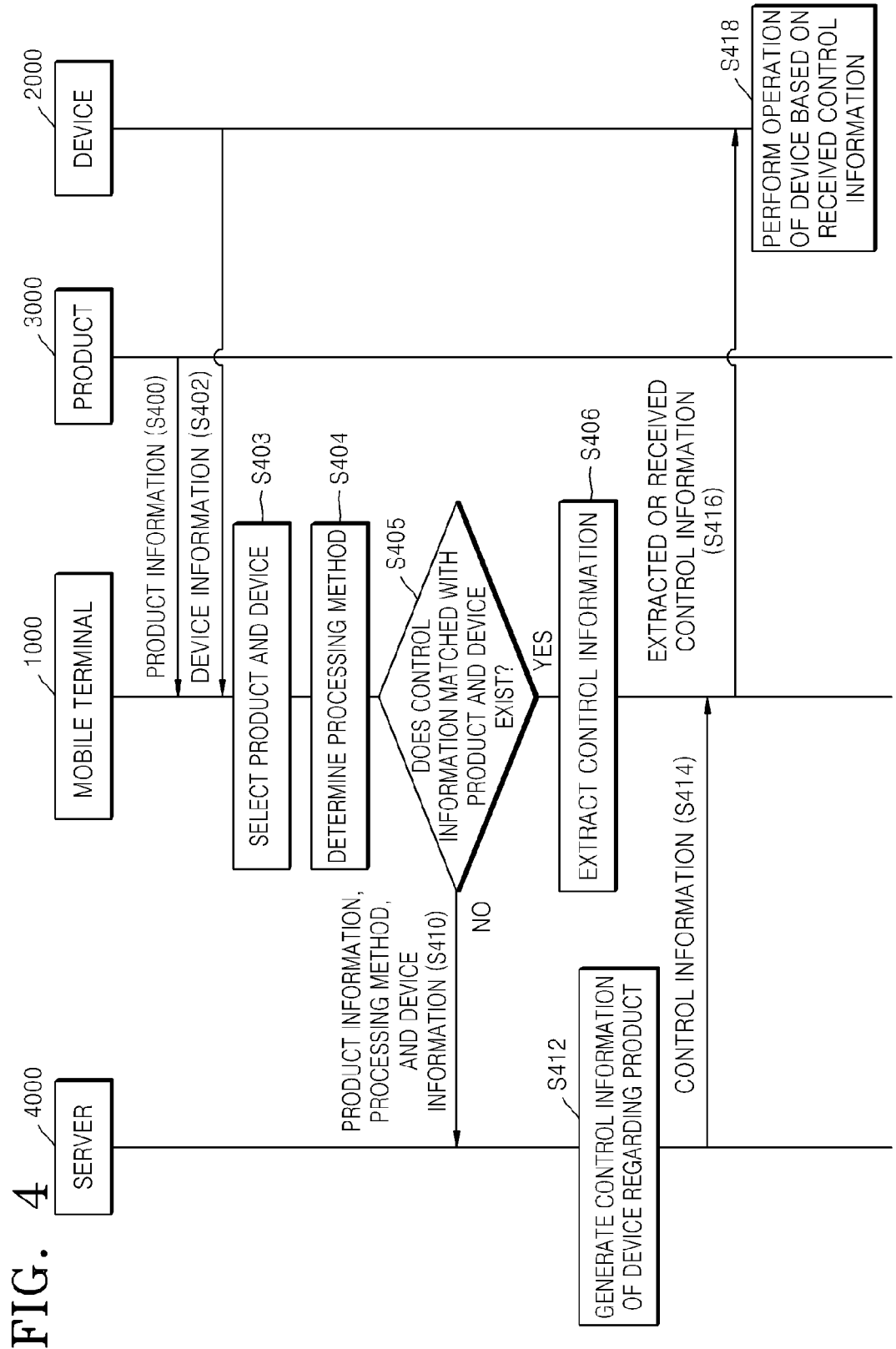
FIG. 4 is a diagram for describing a mobile terminal displaying a list of control information for processing a product through a device, and providing control information selected according to a user input to the device, according to an exemplary embodiment.

FIG. 4 is a diagram for describing the mobile terminal 1000 displaying a list of control information for processing the product 3000 using the device 2000, and providing control information selected according to a user input to the device 2000, according to an exemplary embodiment.

The mobile terminal 1000 receives the product information from the product 3000 in operation S400, and receives the device information from the device 2000 in operation S402. Also, the mobile terminal 1000 selects the product 3000 and the device 2000 in operation S403, and determines a processing method for processing the product 3000 using the device 2000 in operation S404. Operations S400 through S404 may respectively correspond to operations S300 through S304, and thus details thereof are omitted for brevity.

In operation S405, the mobile terminal 1000 determines whether control information for the selected product 3000, the selected device 2000, and the determined processing method exists in the mobile terminal 1000. The mobile terminal 1000 may store the control information of the device 2000 regarding the product 3000. Also, the mobile terminal 1000 may determine whether control information corresponding to the selected product 3000, the selected device 2000, and the determined processing method is stored based on previously stored information.

If the control information is stored in the mobile terminal 1000 (S405—YES), the mobile terminal 1000 extracts the control information in operation S406.

If the control information is not stored in the mobile terminal 1000 (S405—NO), the mobile terminal 1000 requests the server 4000 for the control information in operation S410. In operation S410, the mobile terminal 1000 may provide the product information of the selected product 3000, the device information of the selected device 2000, and information about the determined processing method to the server 4000.

In operation S412, the server 4000 generates the control information of the device 2000 for processing the product 3000. In operation S412, the server 4000 may generate the control information by using the device information, the product information, and the processing information of the processing method received from the mobile terminal 1000. The server 4000 may check the processing method of the product 3000, and select a function to be executed in the device 2000 based on the processing method. Also, the server 4000 may generate the control information by combining control commands for the selected function. Here, the control commands may be arranged according to a predetermined order.

In operation S414, the server 4000 transmits the control information to the mobile terminal 1000. The server 4000 may provide the identification value of the device 2000 and the identification value of the product 3000, together with the control information generated in operation S414, to the mobile terminal 1000.

In operation S416, the mobile terminal 1000 provides the received control information or the extracted control information to the device 2000. If the mobile terminal 1000 is within communication range of the device 2000, the mobile terminal 1000 may transmit the control information to the device 2000 via short range communication. For example, when the mobile terminal 1000 selects the processing method for processing the product 3000 and approaches the device 2000 within a predetermined time from selecting the processing method, the mobile terminal 1000 may provide the device 2000 with the control information for processing the product 3000 according to the processing method.

Also, when the mobile terminal 1000 is within communication range of the device 2000 within a predetermined time, the mobile terminal 1000 may provide the control information to the device 2000. For example, when the mobile terminal 1000 approaches the device 2000 within a predetermined time after the mobile terminal 1000 selects at least one of the product 3000 and the device 2000, the control information may be transmitted from the mobile terminal 1000 to the device 2000.

In operation S418, the device 2000 performs an operation based on the received control information. The device 2000 may process the product 3000 according to a predetermined method by sequentially performing control commands included in the control information.

Figure 5:
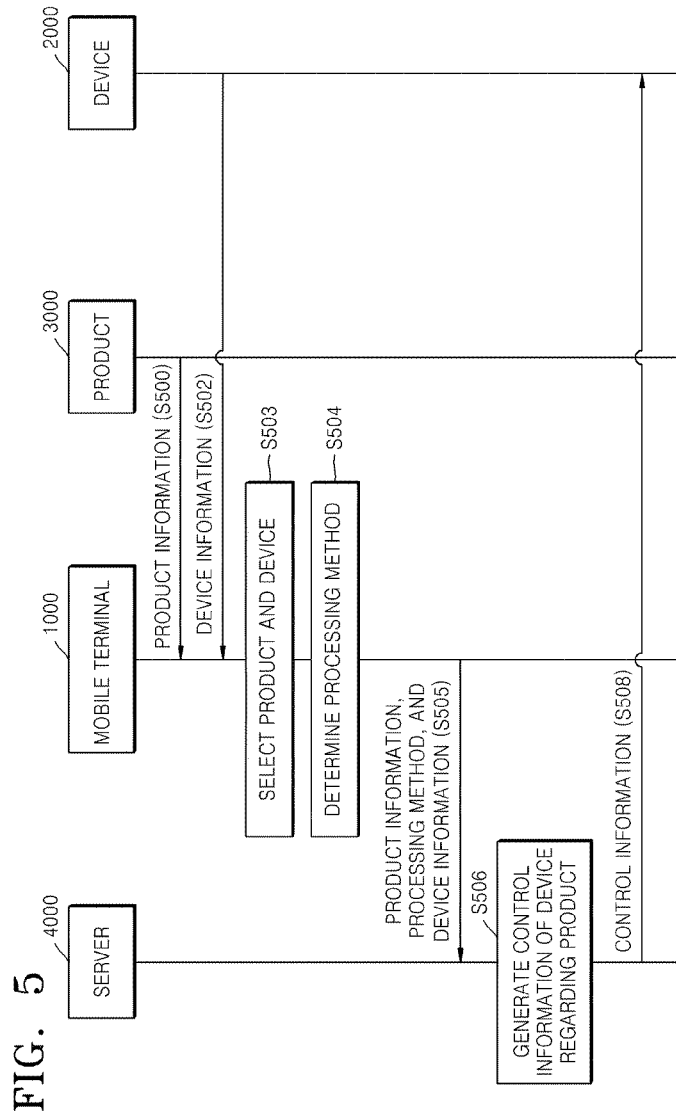
FIG. 5 is a diagram for describing a server generating a control command based on device information and product information received from a mobile terminal, and providing the generated control command to a device, according to an exemplary embodiment.

FIG. 5 is a diagram for describing the server 4000 generating a control command based on device information and product information received from the mobile terminal 1000, and providing the generated control command to the device 3000, according to an exemplary embodiment.

The mobile terminal 1000 receives the product information from the product 3000 in operation S500, and receives the device information from the device 2000 in operation S502. Also, the mobile terminal 1000 selects the product 3000 and the device 2000 in operation S503, and determines a processing method for processing the product 3000 in operation S504. Operations S500 through S504 may respectively correspond to operations S300 through S304, and thus details thereof are omitted for brevity.

In operation S505, the mobile terminal 1000 requests the server 4000 for the control information In operation S505, the mobile terminal 1000 may provide the product information of the selected product 3000, the device information of the selected device 2000, and information about the determined processing method to the server 4000.

In operation S506, the server 4000 generates the control information of the device 2000 for processing the product 3000 according to the processing method. In operation S506, the server 4000 may generate the control information by using the device information, the product information, and the processing information of the processing method received from the mobile terminal 1000. The server 4000 may check the processing method of the product 3000, and select a function to be executed by the device 2000 based on the processing method. Then, the server 4000 may generate the control information by combining control commands of the selected function. Here, the control commands may be arranged according to a predetermined order.

In operation S508, the server 4000 provides the control information to the device 2000. Here, the device 2000 and the server 4000 may transmit and receive data with each other via a predetermined communication channel, and the server 4000 may provide the control information to the device 2000 via the predetermined communication channel. The server 4000 may receive communication information about the device 2000, such as a phone number or an Internet protocol (IP) address, from the mobile terminal 1000, and provide the control information directly to the device 2000 based on the communication information.

Figure 6:
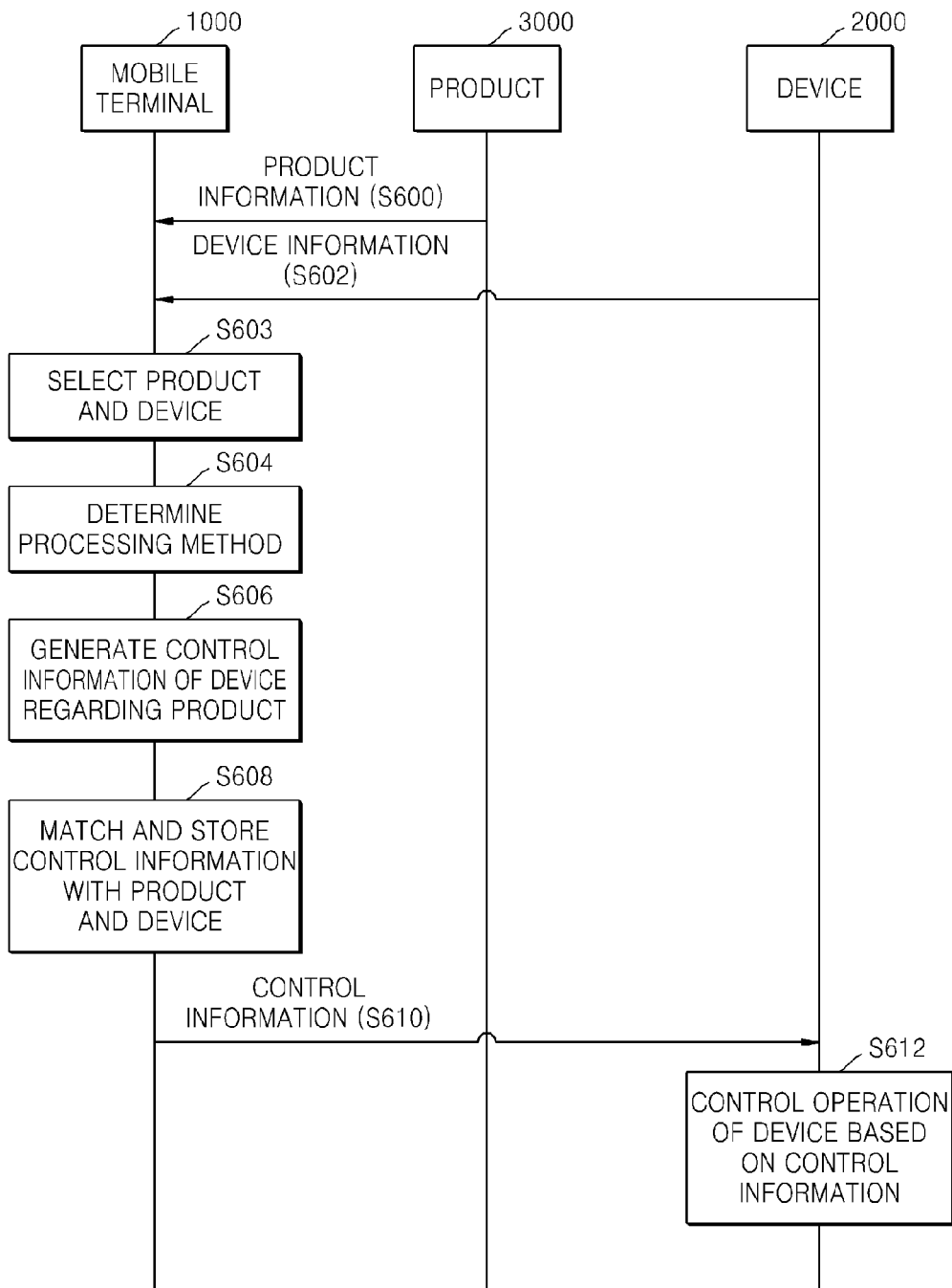
FIG. 6 is a diagram for describing a mobile terminal generating control information of a device in regard to a product, and providing the generated control information to the device, according to an exemplary embodiment.

FIG. 6 is a diagram for describing the mobile terminal 1000 generating control information of the device 2000 about the product 3000, and providing the generated control information to the device 2000, according to an exemplary embodiment.

The mobile terminal 1000 may receive the product information from the product 3000 in operation S600, and receive the device information from the device 2000 in operation S602. Also, the mobile terminal 1000 selects the product 3000 and the device 2000 in operation S603, and determines a processing method for processing the product 3000 in operation S604. Operations S600 through S604 may respectively correspond to operation S300 through S304, and thus details thereof are omitted for brevity.

Also, in operation S604, the mobile terminal 1000 may receive communication information for determining the processing method from an external source, such as a website of a manufacturer of the product 3000. The information for determining the processing method may include processing methods and evaluation information of the user regarding the processing methods. The evaluation information denotes information related to evaluation on a result of processing a product according to the processing method, and may include an evaluation score or a user comment, but is not limited thereto. The mobile terminal 1000 may connect to the website by using a link address of the website included in the product information, and receive the information for determining the processing method from the website. If the link address is not included in the product information, the mobile terminal 1000 may obtain the link address from a separate search server (not shown) by using at least one of a type of the product 3000, a model name of the product 3000, and the manufacturer of the product 3000, included in the product information. Alternatively, the mobile terminal 1000 may receive the information for determining the processing method through an SNS.

In operation S606, the mobile terminal 1000 generates the control information of the device 2000 for processing the product 3000. In operation S606, the mobile terminal 1000 may generate the control information using the device information, the product information, and the determined processing method. The mobile terminal 1000 may check the processing method of the product 3000, and select a function to be executed by the device 2000 according to the processing method. Alternatively, the mobile terminal 1000 may generate the control information by combining control commands of the selected function. Here, the control commands may be arranged according to a predetermined order. For example, the mobile terminal 1000 may check a temperature value and a time value for cooking a pizza. Also, the mobile terminal 1000 may extract control commands for setting a temperature and a cooking time of an oven according to the temperature value and time value, from device information of the oven. Alternatively, the mobile terminal 1000 may generate the control information by sequentially arranging a control command for turning on the oven, a control command for setting the temperature of the oven, a control command for setting the cooking time of the oven, and a control command for executing a cooking function of the oven.

In operation S606, the mobile terminal 1000 may receive information for generating the control information from a web site of a manufacturer of the device 2000. The mobile terminal 1000 may connect to the website by using a link address of the website included in the device information, and receive the information for generating the control information from the website. For example, the mobile terminal 1000 may receive information about a control command supported by the device 2000. If the link address is not included in the device information, the mobile terminal 1000 may obtain the link address from a separate search server (not shown) by using at least one of a type of the device 2000, a model name of the device 2000, and a manufacturer of the device 2000 included in the device information. Alternatively, the mobile terminal 1000 may receive the information for generating the control information through a SNS.

In operation S608, the mobile terminal 1000 associates the control information with the product 3000 and the device 2000, and stores the associated information. The mobile terminal 1000 may associate the control information with a combination of the product 3000 and the device 2000, and store the associated information in a table, index, database, or the like. Also, the mobile terminal 1000 may store the associated information with a type, manufacturer, processing date, and processing method of the product 3000, and count and store a number of times the device 2000 is controlled according to processing methods of the product 3000. For example, the mobile terminal 1000 may store the model name of the pizza, the model name of the oven, and the method (for example, temperature: 140° C., time: 3 minutes) of cooking the pizza in the oven, and may also store the dates when the pizza was cooked and the number of times the method has been used. The mobile terminal 1000 may store a user evaluation score according to processing methods.

Also, the information stored in operation S608 may be used to determine a preference of the user, or may be used by the mobile terminal 1000 to recommend a processing method for processing the product 3000.

In operation S610, the mobile terminal 1000 provides the control information to the device 2000. In operation S610, if the mobile terminal 1000 is within a communication range of the device 2000, the mobile terminal 1000 may transmit the control information to the device 2000 via short range communication. For example, when the mobile terminal 1000 selects the processing method for processing the product 3000 and is within communication range of the device 2000 within a predetermined time after the selection, the mobile terminal 1000 may provide the control information corresponding to the determined processing method to the device 2000.

Also, when the mobile terminal 1000 is within communication range of the device 2000 within a predetermined time, the mobile terminal 1000 may provide the control information to the device 2000. For example, when the mobile terminal 1000 is within communication range of the device 200 within a predetermined time after the mobile terminal 1000 selects at least one of the product 3000 and the device 2000, the control information may be provided from the mobile terminal 1000 to the device 2000.

In operation S612, the device 2000 performs an operation based on the received control information. The device 2000 may process the product 3000 according to a predetermined method by sequentially performing control commands included in the control information.

FIG. 7 is a table showing device information according to an exemplary embodiment.

Referring to FIG. 7, the table may include a type field 70, a model name field 71, a manufacturer field 72, a target product field 73, and a function field 74.

A type of the device 2000, such as an oven, a washing machine, or a TV, is recorded in the type field 70. The type field 70 is a field that describes the device 2000, and may include various information. Also, a model name of the device 2000 is recorded in the model name field 71, and a manufacturer of the device 2000 is recorded in the manufacturer field 72. A type value of the device 2000 may be used to recommend the device 2000 related to the product 3000 or determine the device 2000 corresponding to the product 3000, but is not limited thereto.

Also, a type of the product 3000 to be processed by the device 2000 is recorded in the target product field 73. For example, when the device 2000 is an oven, a pizza, a soup, or a stew may be recorded in the target product field 73, and when the device 2000 is a washing machine, shirt, jeans, or suits may be recorded in the target product field 73. Alternatively, for example, when the device 2000 is a TV, an extension name of a content file supported by the TV may be recorded. The target product field 73 may be used to generate a list of product information related to the device 2000 or to select the product 3000 corresponding to the device 2000, but is not limited thereto.

Also, information about a function provided by the device 2000 is recorded in the function field 74. For example, when the device 2000 is the oven, functions of the oven may be stored in the function field 74: on, off, select mode, set temperature, set time, and a cook command to begin cooking according to the mode, temperature, and time. Such information about a function supported by the device 2000 may be used generate control commands for causing the device 2000 to execute the processing method.

The device information may be formatted for transmission over NFC, and therefore short range communication may be performed between the mobile terminal 1000 and the device 2000 for exchanging the device information.

FIG. 8 is a table showing product information according to an exemplary embodiment.

Referring to FIG. 8, the table may include a type field 80, a product identification (ID) field 81, a manufacturer field 82, a device field 83, and a processing method field 84.

A type of the product 3000, such as a pizza or a sweater, is recorded in the type field 80. A type value of the product 3000 may be used to recommend the products 3000 related to the device 2000 for processing by the device or to determine the product 3000 corresponding to the device 2000, but is not limited thereto. The type field 80 is a field that describes the product, and may include various information. Also, a model name of the product 3000 may be recorded in the product ID field 81, and a manufacturer of the product 3000 may be recorded in the manufacturer field 82.

Also, at least one of a type and a model name of the device 2000 capable of processing the product 3000 may be recorded in the device field 83. The device field 83 may be used to generate a list of device information related to the product 3000, or to select the device 2000 corresponding to the product 3000, but is not limited thereto.

Also, information about a processing method for processing the product 3000 using the device 2000 is recorded in the processing method field 84. For example, when the product 3000 is a pizza having a model name 'Pi-12-001' and the device 2000 is an oven having a model name 'Ov-12-001', a processing method 'temperature: 140° C., time: 3 minutes' may be recorded in the processing method field 84. The information about the processing method included in the product information may be predetermined by a manufacturer while manufacturing the product 3000, but is not limited thereto. Also, the information recorded in the processing method field 84 may be used to determine control commands corresponding to functions of the device 2000 are to be used by the server 4000 or the mobile terminal 1000 to generate the control information for controlling the device 2000 to execute the process on the product 3000.

The product information may be formatted for transmission over NFC, and therefore short range communication may be performed between the mobile terminal 1000 and the product 3000 for exchanging the product information.

FIG. 9 is a table showing control functions supported by the devices 2000, according to an embodiment exemplary.

Referring to FIG. 9, the table may include a model name field 90, a manufacturer field 91, and a control function field 92. A model name of the device 2000 may be recorded in the model name field 90, and a manufacturer of the device 2000 may be recorded in the manufacturer field 91. Also, information about a control function provided by the device 2000 may be recorded in the control function field 92. For example, control functions of on, off, select mode, increase cooking temperature, decrease cooking temperature, input temperature value, increase cooking time, decrease cooking time, input cooking time, and start cooking may be recorded with respect to an oven having a model name 'Ov-12-001'.

Also, although not illustrated in FIG. 9, control commands corresponding to each control function may be recorded in the table. The control commands are commands that may be interpreted by the device 2000 to control the device 2000 to perform a function. For example, a control command may be an 'ON' command that causes the device 2000 to be activated.

Information about the control functions and control commands may be used to determine which control functions are to be selected for the device 2000 or the server 4000 to realize a processing method for causing the device 2000 to process the product 3000.

Also, the information about the control functions may be included in the device information and provided from the device 2000 to the mobile terminal 1000 or the server 4000, but is not limited thereto. The mobile terminal 1000 or the server 4000 may receive such information from a separate server (not shown) by using an identification value of the device 2000.

FIG. 10 is a table showing control information for realizing a predetermined processing method, according to an exemplary embodiment.

Referring to FIG. 10, the table may include a product ID field 10, a device ID field 11, a processing method field 12, and a control operation field 13. A model name of the product 3000 may be recorded in the product ID field 10, and a model name of the device 2000 may be recorded in the device ID field 11. Also, information about a processing method for processing the product 3000 may be recorded in the processing method field 12, and a detailed operation of the device 2000 for operating the device 2000 according to the processing method may be recorded in the control operation field 13. For example, when a pizza is to be heated for 5 minutes at 120° C., an operation of turning on an oven, an operation of inputting 120° C. as a temperature value to the oven, an operation of inputting 5 minutes as a cooking time to the oven, and an operation of starting cooking may be sequentially arranged as control operations of the oven and commands corresponding to the control operations may be transmitted to the oven to execute the method of processing the product. Also, although not illustrated in FIG. 10, the control command corresponding to each control operation may also be recorded in the table. The control command may be formatted such that the device is able to interpret the control command. Further, the control commands transmitted to the device 2000 may be formatted for transmission over NFC, and therefore short range communication may be performed between the mobile terminal 1000 and the device 2000 for exchanging the control commands. Such control information may be generated by the mobile terminal 1000 or provided from the server 4000 to the mobile terminal 1000. Also, by providing the control information from the mobile terminal 1000 to the device 2000, the device may sequentially execute predetermined functions for executing the method of processing the product. FIG. 11 is a table showing information about a control history associated with the product 3000 and the device 2000, and stored in the mobile terminal 1000, according to an exemplary embodiment.

Referring to FIG. 11, the table may include a type field 20, a product ID field 21, a manufacturer field 22, a device field 23, a processing date field 24, a processing method field 25, and a count field 26.

A type value of the product 3000 may be recorded in the type field 20 and a model name of the product 3000 may be recorded in the product ID field 21. Also, a manufacturer of the product 3000 may be recorded in the manufacturer field 22, and a type and model name of the device 2000 that processed the product 3000 may be recorded in the device field 23. Also, a processing date indicating when the product 3000 is processed may be recorded in the processing date field 24 and information about a processing method of the product 3000 may be recorded in the processing method field 25. The processing date field 24 may indicate multiple dates, but may also indicated only a most recent date. Also, the count field 26 stores a number of times the process was performed by the product 3000 on the device 2000 using the processing method.

Also, although not illustrated in FIG. 11, the table may further include information about a function and a control command of the device 2000 for processing the product 3000 according to the processing method.

A device 2000 may be recommended for processing a selected product 3000 based on the table. Alternatively, a product 3000 for processing by the device 2000 may recommend based on the table. Alternatively, the mobile terminal 1000 may generate control commands of a device 2000 for processing a product 3000 based on the table.

Figure 12:
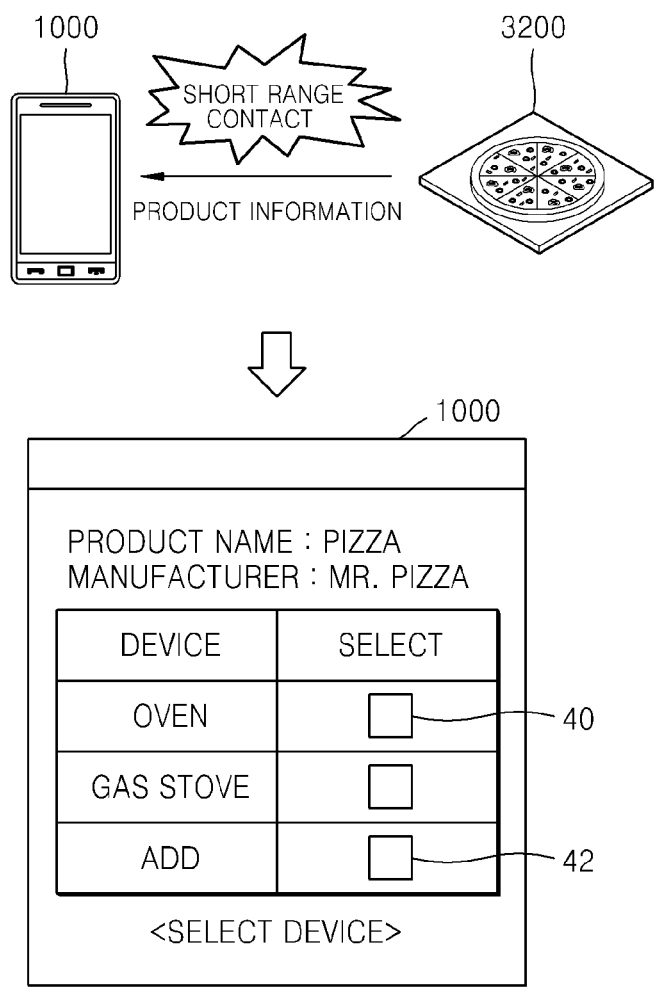
FIG. 12 is a diagram for describing a mobile terminal displaying a selection list of devices corresponding to a product, according to an exemplary embodiment.

FIG. 12 is a diagram for describing the mobile terminal 1000 displaying a selection list of the devices 2000 for processing a product, according to an exemplary embodiment.

Referring to FIG. 12, when the mobile terminal 1000 is within communication range of a pizza 3200, the mobile terminal 1000 may receive product information from a tag included in packaging of the pizza 3200 and select the pizza 3200 as a process target.

Then, the mobile terminal 1000 may recommend the device 2000 for cooking the pizza 3200 based on at least one of product information about the pizza 3200, pre-stored device information, and pre-stored information about a control history. In FIG. 12, an oven and a gas stove, which are recommended by the mobile terminal 1000, are displayed on a device list, and a user may select the oven by touching an icon 40. Alternatively, the user may add a new device 2000 for cooking the pizza 3200 by touching an icon 42. Here, device information of the new device may be received and registered when the mobile terminal 1000 is within communication range of the new device within a predetermined time after the icon 42 is touched, but the receiving and registering of the device information is not limited thereto.

Meanwhile, in FIG. 12, an example of displaying a device list for processing a product determined by the mobile terminal 1000 is described, but is not limited thereto.

The mobile terminal 1000 may determine a product, and generate control information for processing the product with respect to devices registered in the mobile terminal 1000. For example, when the mobile terminal 1000 determines the pizza 3200 as the product, control information for processing the pizza 3200 with respect to the oven and the gas stove registered in the mobile terminal 1000 may be generated.

Then, the mobile terminal 1000 may approach a predetermined device, identify the predetermined device, extract control information about the predetermined device, and provide the control information to the predetermined device. For example, when the mobile terminal 1000 is within communication range the oven, the mobile terminal 1000 may identify the oven and provide control information for the oven to process the product from among information in the mobile terminal 1000.

Figure 13:
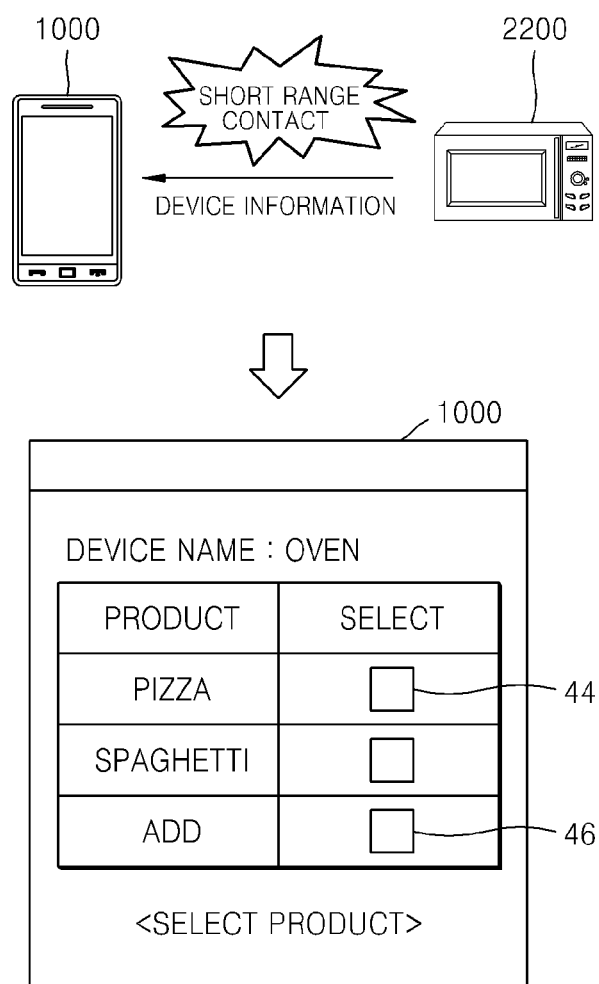
FIG. 13 is a diagram for describing a mobile terminal displaying a selection list of products corresponding to a device, according to an exemplary embodiment.

FIG. 13 is a diagram for describing the mobile terminal 1000 displaying a selection list of the products 3000 corresponding to the device 2000, according to an exemplary embodiment.

Referring to FIG. 13, when the mobile terminal 1000 is within communication range of an oven 2200, the mobile terminal 1000 receives device information from the oven 2200 and may select the oven 2200 as a device for processing the product 3000. Then, the mobile terminal 1000 may recommend the product 3000 to be cooked by the oven 2200, based on at least one of the device information of the oven 2200, product information, and information about a control history. In FIG. 13, pizza and spaghetti, which are products recommended by the mobile terminal 1000 to be processed by the oven 2200, are displayed on a product list, and a user may select the pizza by touching an icon 44. Also, the user may add a new product 3000 to be cooked by the oven 2200 by touching an icon 46. Here, product information may be received and registered if the mobile terminal 1000 is within a communication range of the new product within a predetermined time after the icon 46 is touched, but receiving and registering of product information are not limited thereto.

Meanwhile, in FIG. 13, the mobile terminal 1000 displays the selection list of products 3000 regarding one device 2000, but is not limited thereto. The mobile terminal 1000 may display a selection list of products regarding a plurality of devices. For example, the mobile terminal 1000 may receive device information by sequentially approaching the oven 2200 and a refrigerator (not shown), and display a selection list of the products that may be cooked by the oven 2200 from among products stored in the refrigerator. In this case, the mobile terminal 1000 may associate product information with the plurality of devices and store the associated information.

FIG. 14 is a diagram of a selection list for selecting a processing method for processing a product, according to an exemplary embodiment.

Referring to FIG. 14, the mobile terminal 1000 may display a list of cooking methods for cooking a pizza using an oven. For example, when the oven and the pizza are selected as the product and device, the mobile terminal 1000 may display a list of a first cooking method (heat for 3 minutes at 140° C.) and a second cooking method (heat for 5 minutes at 120° C.). Such a list may be generated based on information about a control history, but is not limited thereto. The list may be generated based on a preference of a user, such as the frequency with which each method is selected by the user.

The user may touch an icon 50 to select the first cooking method, or touch an icon 52 to change or add a predetermined cooking method. Cooking methods selected by the user may be accumulated and stored in the mobile terminal 1000 to generate a history.

Figure 15:
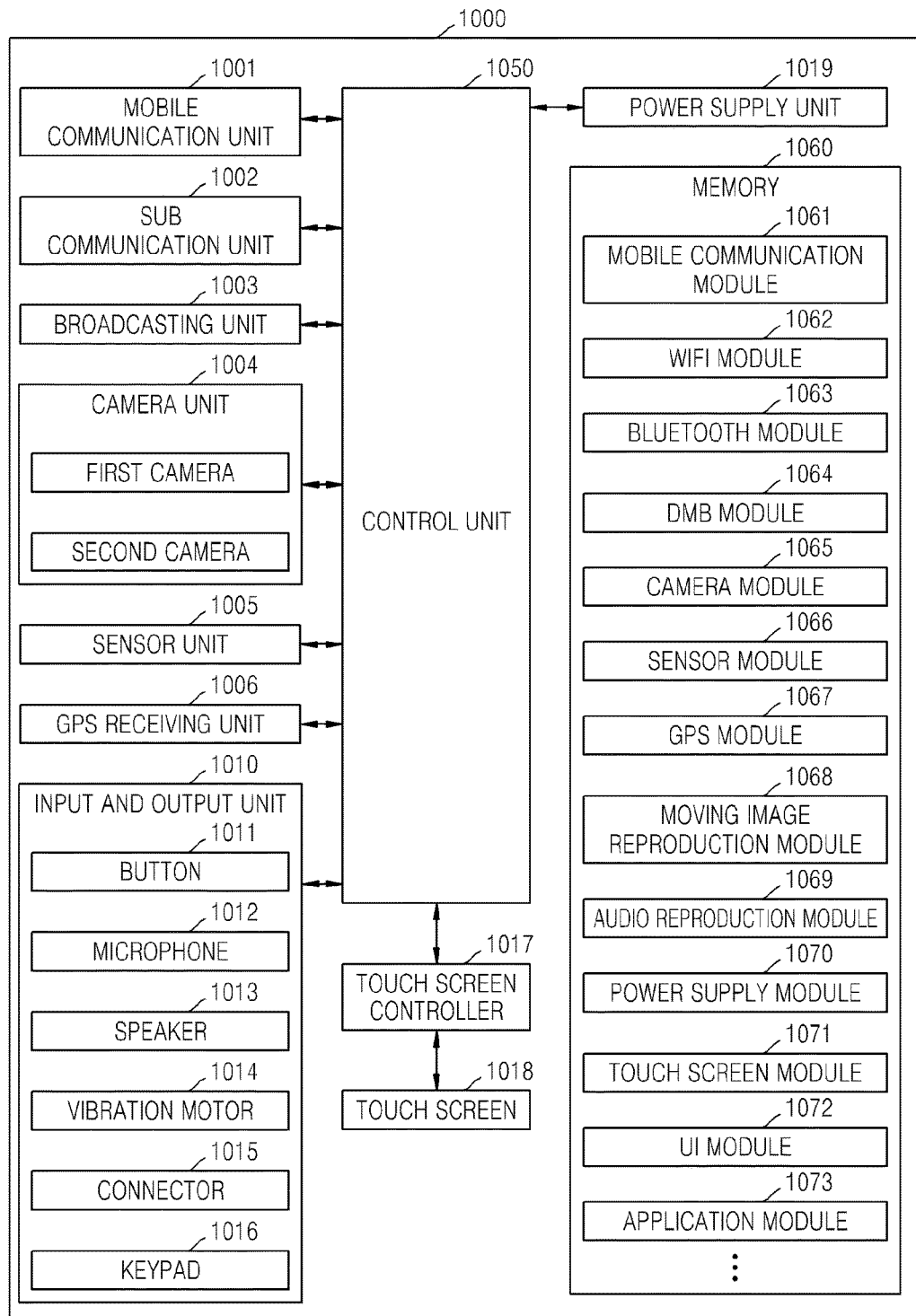
FIG. 15 is a block diagram of a mobile terminal according to an exemplary embodiment.

FIG. 15 is a block diagram of the mobile terminal 1000 according to an exemplary embodiment. The mobile terminal 1000 may include a mobile communication unit 1001, a sub communication unit 1002, a broadcasting unit 1003, a camera unit 10004, a sensor unit 1005, a global positioning system (GPS) receiving unit 1006, an input and output (I/O) unit 1010, a touch screen controller 1017, a touch screen 1018, a power supply unit 1019, a control unit 1050 (CPU), and a memory 1060.

The mobile communication 1001 performs call set up, data communication, etc. with a base station through a cellular network, such as a third Generation (3G) or fourth Generation (4G) network. The sub communication unit 1002 performs communication, such as near field communication (NFC), Zigbee, Wifi, or Bluetooth network communication. A broadcasting unit 1003 receives a digital multimedia broadcasting (DMB) signal.

The camera unit 1004 includes a lens and optical devices for capturing a still image or a moving image.

The sensor unit 1005 may include a gravity sensor for detecting movement of the mobile terminal 1000, an illumination sensor for detecting brightness of light, a proximity sensor for detecting a proximity degree of a person, and a motion sensor for detecting movement of the person.

The global positioning system (GPS) receiving unit 1006 receives a GPS signal from a satellite. Various services may be provided to the user by using such a GPS signal.

The input and output unit 1010 provides an interface with an external device or a person, and includes a button 1011, a microphone 1012, a speaker 1013, a vibration motor 1014, a connector 1015, and a keypad 1016.

A touch screen 1018 receives a touch input of the user. Also, a touch screen controller 1017 transmits the touch input received through the touch screen 1018 to a control unit 1050. A power supply unit 1019 is connected to a battery or an external power source to supply power to the mobile terminal 1000.

The control unit 1050 controls the mobile terminal 1000 and executes programs stored in a memory 1060.

The programs stored in the memory 1060 may be classified into a plurality of modules according to functions. In other words, the programs may be classified into a mobile communication module 1061, a WiFi module 1062, a Bluetooth module 1063, a DMB module 1064, a camera module 1065, a sensor module 1066, a GPS module 1067, a moving image reproduction module 1068, an audio reproduction module 1069, a power supply module 1070, a touch screen module 1071, a user interface (UI) module 1072, and an application module 1073.

Functions of each module may be intuitively inferred by one of ordinary skill in the art based on its name, and each module may correspond to a set of control commands for performing at least one function described with reference to FIGS. 1 through 6.

For example, a short range communication module (not shown) may receive product information and device information. The short range communication module may include the Bluetooth module 1063 and the WiFi module 1062, but is not limited thereto.

Also, for example, the application module 1073 may register the device information and the product information, and select a processing method for processing the product 3000 using the device 2000. Alternatively, for example, the application module 1073 may provide at least one of the product information, the device information, and the processing method to the server 4000, and receive control information from the server 4000 by using the mobile communication unit 1001 and the sub communication unit 1002. Alternatively, for example, the application module 1073 may generate control information by using the product information, the device information, and information about the processing method, and the short range communication module may provide the control information to the device 2000 via short range communication.

Also, for example, the memory 1060 may store the device information and the product information, and the UI module 1072 may generate and display a selection list of devices, a selection list of products, and a selection list of processing methods.

Also, for example, the memory 1060 may store information about a control history, and the application module 1073 may determine the user's preference of the product 3000, the device 2000, and the processing method.

Control commands may not be executed according to a separate software program, procedure, or module. The memory 1060 may include additional control commands or lesser control commands. In addition, various functions of a device may be performed by hardware and/or software including one or more signal processing and/or application specified integrated circuits (IC s).

Figure 16:
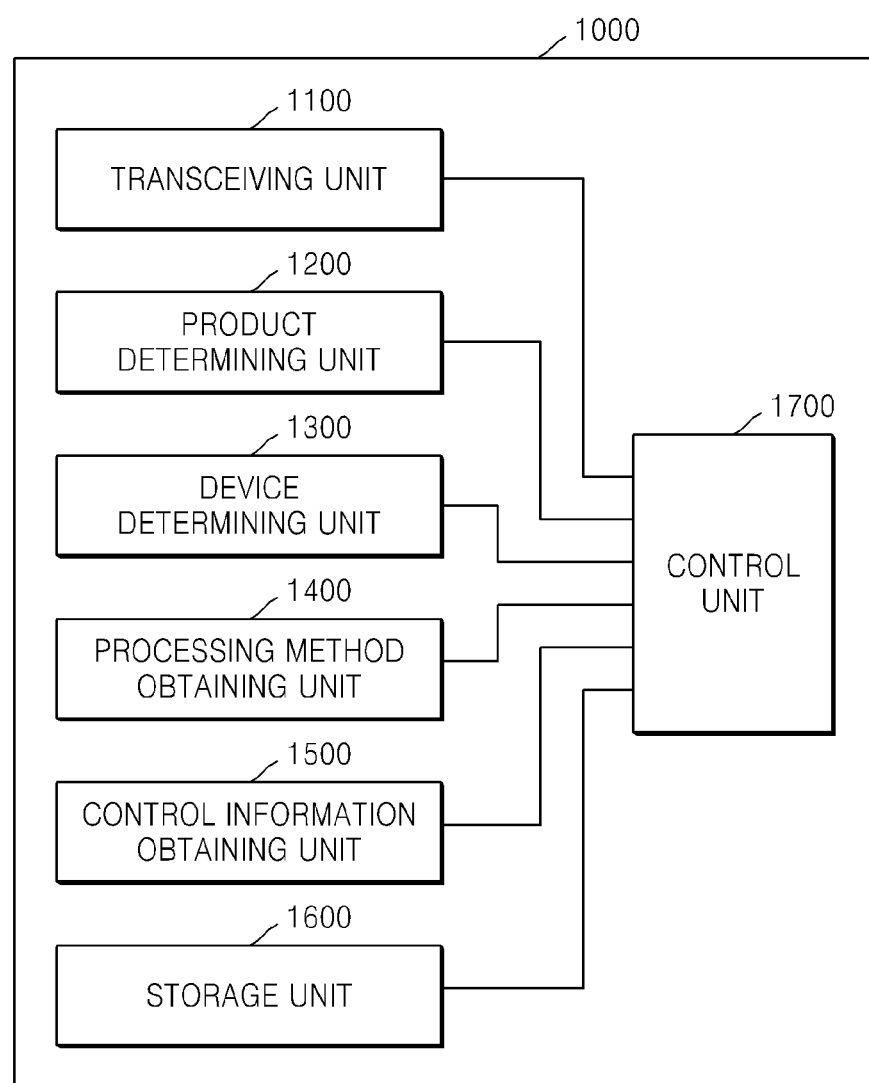
FIG. 16 is a block diagram of a mobile terminal according to another exemplary embodiment.

FIG. 16 is a block diagram of the mobile terminal 1000 according to another exemplary embodiment.

As shown in FIG. 16, the mobile terminal 1000 includes a transceiving unit 1100, a product determining unit 1200, a device determining unit 1300, a processing method obtaining unit 1400, a control information obtaining unit 1500, a storage unit 1600, and a control unit 1700.

The transceiving unit 1100 receives the product information from the product 3000. The transceiving unit 1100 may receive the product information from the tag of the product 3000, via short range communication. The tag may be included in or attached to the product 3000, or attached to a packaging of the product 3000, but is not limited thereto. The received product information may be registered and stored in the storage unit 1600. The received product information may be stored according to times and locations.

Also, the transceiving unit 1100 receives the device information from the device 2000. When the mobile terminal 1000 approaches the device 2000 to within a predetermined range, the transceiving unit 1100 may receive the device information from the device 2000 via short range communication. The transceiving unit 1100 may store the received device information in the storage unit 1600. For example, the transceiving unit 1100 may store device information of home appliances, such as a washing machine, a drier, an oven, a toaster, and a TV.

Also, the transceiving unit 1100 transmits control information to the device 2000. If it is determined that the mobile terminal 1000 is within communication range of the device 2000, the transceiving unit 1100 may transmit the control information to the device 2000 via short range communication.

The product determining unit 1200 may display a list of stored product information, and select a predetermined product based on a user input. The product determining unit 1200 may display the list by grouping related products together. For example, a pizza, a soup, and a stew may be grouped in a 'food' category, and a shirt, a sweater, and pants may be grouped in a 'clothes' category, but the grouping of the related products is not limited thereto. Also, selection lists of product information may be distinguished and displayed according to times when the selection lists are displayed and locations of the mobile terminal 1000. Also, when the device 2000 is selected first, a selection list of product information related to the device 2000 may be displayed. For example, when an oven is selected, a selection list of a pizza, a soup, and a stew, which are related to the oven, may be displayed.

When the list of product information does not include a product desired by the user, the user may maneuver the mobile terminal 1000 within communication range of the desired product so that the product determining unit 1200 may receive product information and select the received product information. Alternatively, when the device determining unit 1300 selects the device 2000, the transceiving unit 1100 may receive product information within a predetermined time after the device determining unit 1300 selects the device 2000.

The device determining unit 1300 may display a list of registered device information, and select a predetermined device based on a user input. The device determining unit 1300 may group and display related devices. For example, an oven, a toaster, and a gas stove may be grouped in a 'cooking appliance' category, but the grouping of related devices is not limited thereto. Selection lists of device information may be distinguished and displayed according to times when the selection lists are displayed and locations of the mobile terminal 1000. Also, when a product is selected first, a selection list of devices related to the selected product may be displayed. For example, when a pizza is selected, a selection list of an oven and a toaster, which are related to the pizza, may be displayed.

If the list of device information does not include a device desired by the user, the user may maneuver the mobile terminal 1000 within communication range of the desired device so that the transceiving unit 1100 receives device information and the device determining unit 1300 selects the desired device. Alternatively, when the product determining unit 1200 selects the product 3000, the transceiving unit 1100 may receive device information within a predetermined time after the product determining unit 1200 selects the product 3000.

The processing method obtaining unit 1400 obtains a processing method for processing the determined product using the determined device. The processing method processing unit 1400 may display a list of processing methods for processing the product by using the device. For example, when an oven and a pizza are determined as a device and a product, a list of a first cooking method (heat for 3 minutes at 140° C.) and a second cooking method (heat for 4 minutes at 120° C.) may be displayed.

The list of processing methods may be generated based on a preference of the user. Processing methods selected by the user may be stored in the storage unit 1600 and the preference of the user for a predetermined product may be determined based on the stored processing methods. For example, regarding a cooking method for cooking foods, a preference of the user, whether the user prefers the food well-done or rare, may be determined. Also, a recommendation list of cooking methods may be displayed based on the preference of the user.

Alternatively, the list of processing methods may be generated based on a preference of another user. The other user may be a friend of the user or a user having similar tastes as the user. Information of a processing history of the other user may be provided to the mobile terminal 1000 from a separate server (not shown), and the processing method obtaining unit 1400 may generate the list of processing methods based on the received information about the processing history.

Alternatively, the processing method obtaining unit 1400 may obtain a processing method through a SNS. For example, the processing method obtaining unit 1400 may transmit information about the determined product and determined device to a terminal (not shown) of the other user using a predetermined SNS server (not shown) or the SNS server. Then, the processing method obtaining unit 1400 may receive a comment of another user about a processing method from the SNS server or the terminal of the other user. Accordingly, the user may determine the processing method by referring to the comment of the other user, and input information about the processing method to the mobile terminal 1000.

The control information obtaining unit 1500 obtains control information of the device 2000 regarding the product 3000. The control information obtaining unit 1500 provides the device information, the product information, and the information about the processing method to the server 4000, and receives the control information from the server 4000. Alternatively, the control information obtaining unit 1500 may only provide the product information and the device information to the server 4000, and receive the control information from the server 4000.

Alternatively, the control information obtaining unit 1500 may generate the control information of the device 2000 regarding the product 3000. The control information obtaining unit 1500 may generate the control information using the device information, the product information, and the information about the processing method. The control information obtaining unit 1500 may check the processing method of the product 3000, and select a function to be executed by the device 2000 based on the processing method. Alternatively, the control information may be generated using control commands for causing the device to execute the selected function. In this case, the control commands may be arranged according to a predetermined order. For example, the control information obtaining unit 1500 may obtain a temperature value and a time value for cooking a pizza. Also, the control information obtaining unit 1500 may extract control commands for setting a temperature and cooking time of an oven according to the temperature value and the time value, from device information about the oven. Then, the control information obtaining unit 1500 may generate control information by sequentially arranging a control command for turning on the oven, a control command for setting a temperature of the oven, a control command for setting a cooking time of the oven, and a control command for starting cooking in the oven.

Alternatively, the control information obtaining unit 1500 may receive information for generating control information from a website of a manufacturer of a device. The control information obtaining unit 1500 may connect to the website using an address of the website included in device information, and receive the information for generating the control information from the website. For example, the control information obtaining unit 1500 may receive information about control commands supported by the device. If the device information does not include the address, the control information obtaining unit 1500 may obtain the address from a separate search server (not shown) by using at least one of a type, a module name, and a manufacturer of the device included in the device information. Alternatively, the control information obtaining unit 1500 may receive the information for generating the control information through a SNS.

The storage unit 1600 stores control information. The storage unit 1600 may store and associate the product information, the device information, the preference of the user, and the control information.

The control unit 1700 controls the overall operations of the mobile terminal 1000, and controls the transceiving unit 1100, the product determining unit 1200, the device determining unit 1300, the processing method obtaining unit 1400, the control information obtaining unit 1500, and the storage unit 1600 such that the mobile terminal 1000 obtains the control information of the device 2000 for processing the product 3000 based on the product information and the device information and provides the obtained control information to the device 2000.

Figure 17:
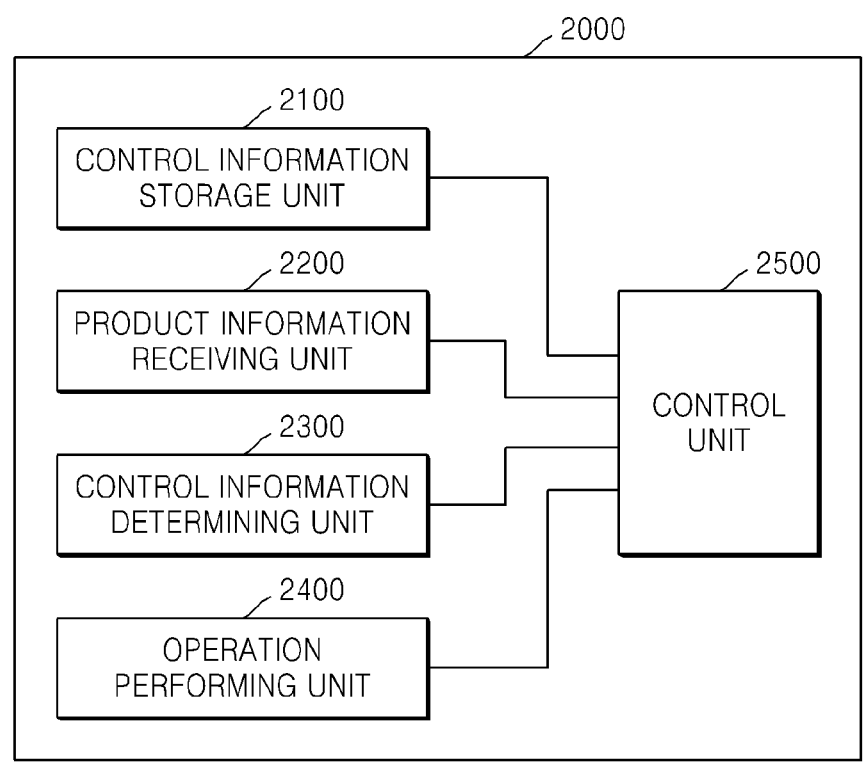
FIG. 17 is a block diagram of a device according to an exemplary embodiment.

FIG. 17 is a block diagram of the device 2000 according to an exemplary embodiment.

As shown in FIG. 17, the device 2000 includes a control information storage unit 2100, a product information receiving unit 2200, a control information determining unit 2300, an operation performing unit 2400, and a control unit 2500.

The control information storage unit 2100 stores control information received from the mobile terminal 1000. The control information storage unit 2100 may store the control information received from the mobile terminal 1000, and operations of the device 2000 may be controlled based on the stored control information.

The product information receiving unit 2200 receives product information from the product 3000. The product information receiving unit 2200 may receive the product information from a tag of the product 3000 via short range communication. For example, when the product 3000 is within a communication range of the device 2000 the product information receiving unit 2200 may receive the product information from the tag of the product 3000 via NFC communication. The tag may be included in or attached to the product 3000, or attached to a packaging of the product 3000, but is not limited thereto.

The control information determining unit 2300 determines control information for performing operations of the device 2000 based on the received product information. The control information determining unit 2300 may check an identification value of the product 3000 from the received product information, and extract control information corresponding to the checked identification value from the control information storage unit 2100. Also, the control information determining unit 2300 may determine the extracted control information as control information for performing the operations of the device 2000.

The control information determining unit 2300 may display a list of extracted control information, and determine control information selected based on a user input as the control information for performing the operations of the device 2000.

Meanwhile, if the control information corresponding to the received product information does not exist in the control information storage unit 2100, the control information determining unit 2300 may receive control information from the mobile terminal 1000. Then, the control information determining unit 2300 may determine the received control information as the control information for performing the operations of the device 2000. The control information determining unit 2300 may receive control information from the mobile terminal 1000 regardless of the receiving of the product information.

The operation performing unit 2400 performs the operations of the device 2000 using the determined control information. The control information may include a plurality of control commands, and the operation performing unit 2400 may perform the operations of the device 2000 by sequentially using the plurality of control commands.

The control unit 2500 controls overall operations of the device 2000, and controls the control information storage unit 2100, the product information receiving unit 2200, the control information determining unit 2300, and the operation performing unit 2400 such that the device 2000 performs an operation of processing the product 3000 based on the control information.

Figure 18:
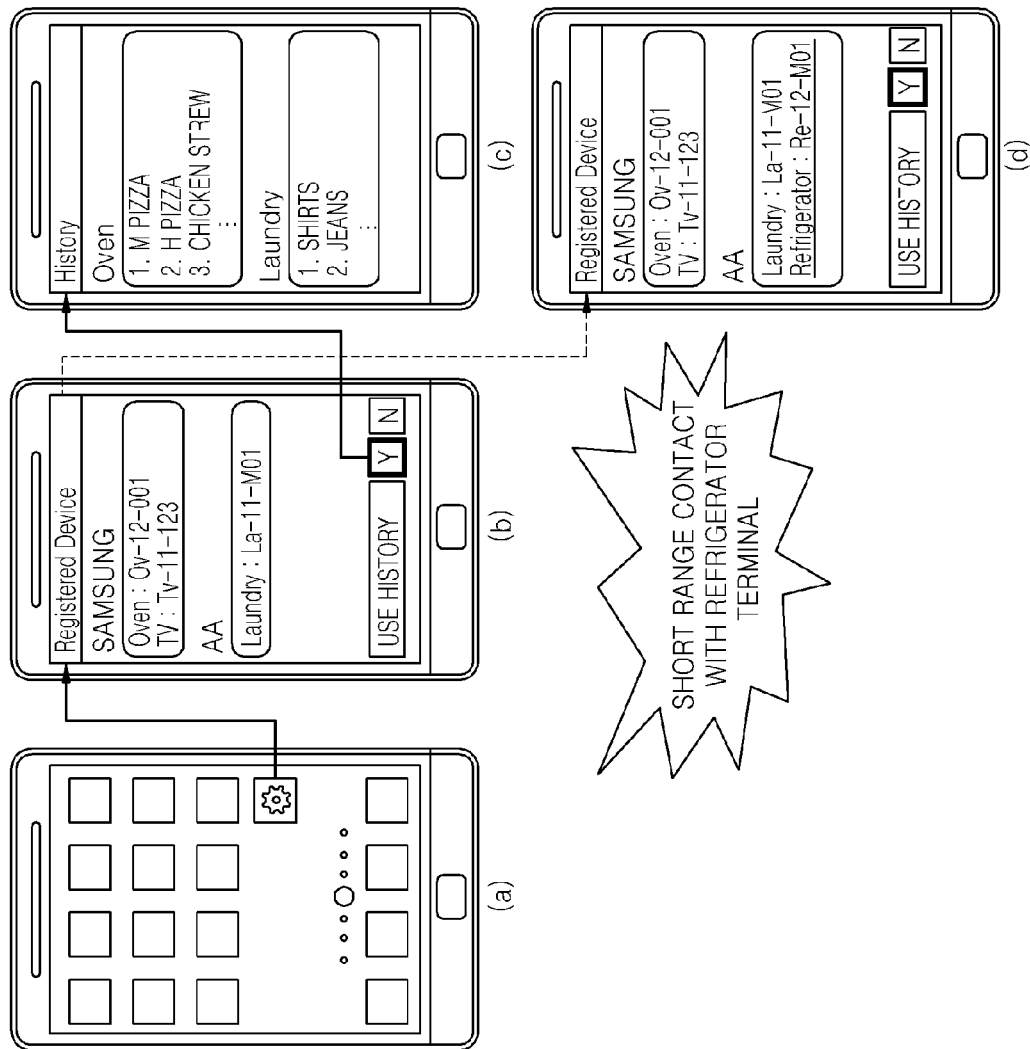
FIG. 18 is a diagram for describing a mobile terminal displaying a device list and a product list on a screen and adding a device to the device list, according to an exemplary embodiment.

FIG. 18 is a diagram for describing the mobile terminal 1000 displaying a device list and a product list on a screen and adding the device 2000 to the device list, according to an exemplary embodiment.

As shown in FIG. 18 (*a*), when a predetermined application is selected based on a user input, the selected application may be executed. When the selected application is executed, the devices 2000 in a selection list registered in the mobile terminal 1000 may be displayed according to manufacturers, as shown in FIG. 18 (*b*). When an icon for displaying a use history of the devices 2000 is selected in FIG. 18 (*b*), a list of products 3000 processed according to the devices 2000 may be displayed, as shown in FIG. 18 (*c*). The user may select a predetermined product from a selection list of the products 3000.

When the mobile terminal 1000 is within communication range of a refrigerator terminal (not shown) in FIG. 18 (*b*), the mobile terminal 1000 may receive device information from the refrigerator terminal. Also, as shown in FIG. 18 (*d*), the refrigerator terminal may be added to the selection list of the devices 2000.

Figure 19:
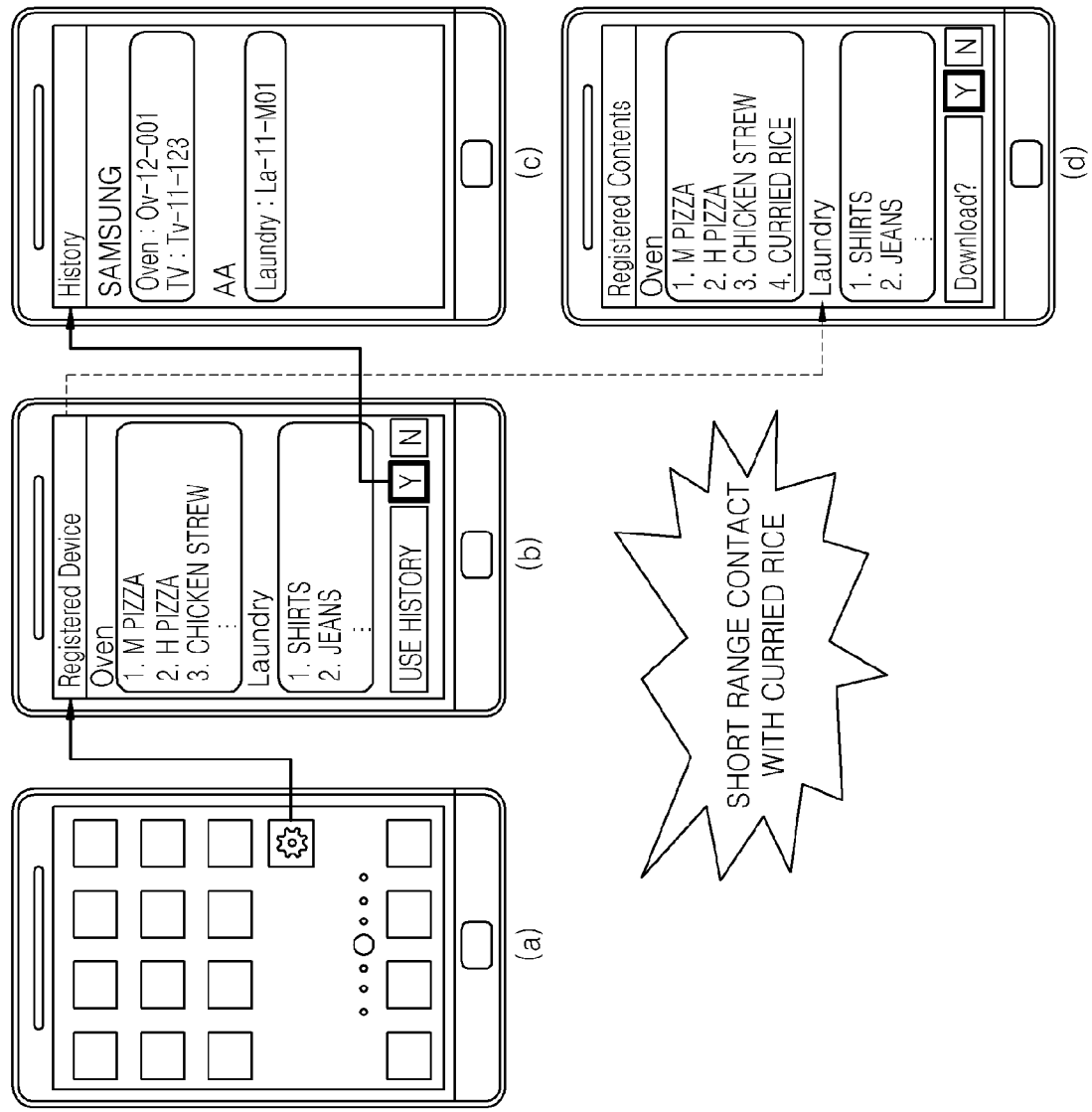
FIG. 19 is a diagram for describing a mobile terminal displaying a product list and a device list and adding a product to the product list, according to an exemplary embodiment.

FIG. 19 is a diagram for describing the mobile terminal 1000 displaying a product list and a device list and adding the product 3000 to the product list, according to an exemplary embodiment.

As shown in FIG. 19 (*a*), when a predetermined application is selected based on a user input, the selected application may be executed. When the selected application is executed, the devices 2000 in a selection list registered in the mobile terminal 1000 may be distinguished and displayed according to types, as shown in FIG. 19 (*b*). When an icon for displaying a use history of the devices 2000 is selected in FIG. 19 (*b*), a list of devices 2000 used according to the products 3000 may be displayed, as shown in FIG. 19 (*c*).

When the mobile terminal 1000 is within communication range of a curried rice product (not shown) in FIG. 19 (*b*), the mobile terminal 1000 may receive product information from a tag in the packaging of the curried rice. Also, as shown in FIG. 19 (*d*), the curried rice may be added to the selection list of the produces 3000.

Figure 20:
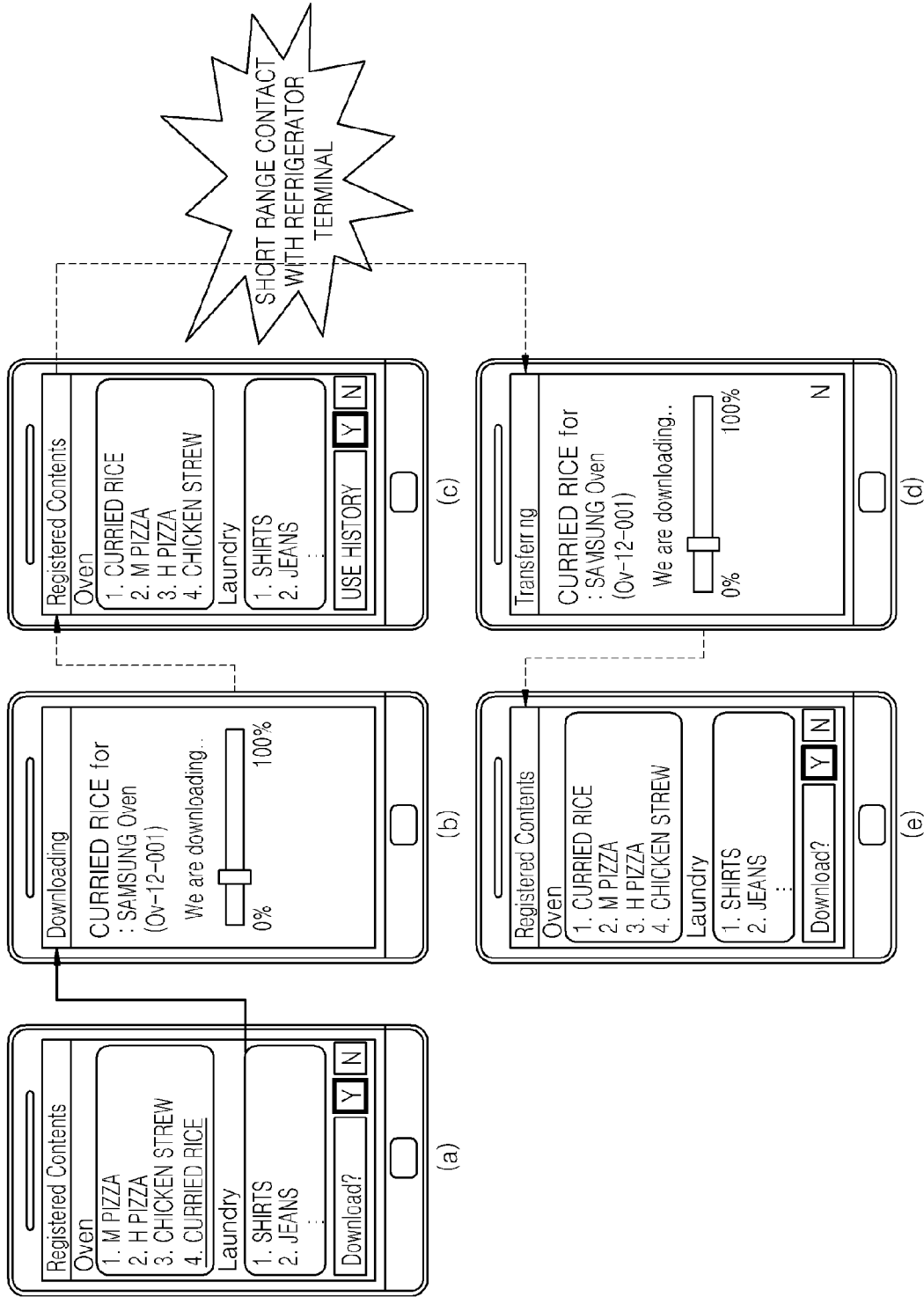
FIG. 20 is a diagram for describing a mobile terminal receiving control information and providing the received control information to a device, according to an exemplary embodiment.

FIG. 20 is a diagram for describing the mobile terminal 1000 receiving control information and providing the received control information to the device 2000, according to an exemplary embodiment.

When curried rice is selected from a product list for an oven and an icon for downloading control information is selected, as shown in FIG. 20 (*a*), the mobile terminal 1000 may receive control information for cooking the curried rice using the oven from the server 4000, as shown in FIG. 20 (*b*). When the control information is received, a screen of the mobile terminal 1000 may be displayed, as shown in FIG. 20 (*c*).

Then, when the mobile terminal 1000 is within communication range of the oven, the mobile terminal 1000 may transmit the control information for cooking the curried rice to the oven, as shown in FIG. 20 (*d*). When the transmission of the control information is completed, the screen of the mobile terminal 1000 may be displayed, as shown in FIG. 20 (*e*).

Figure 21:
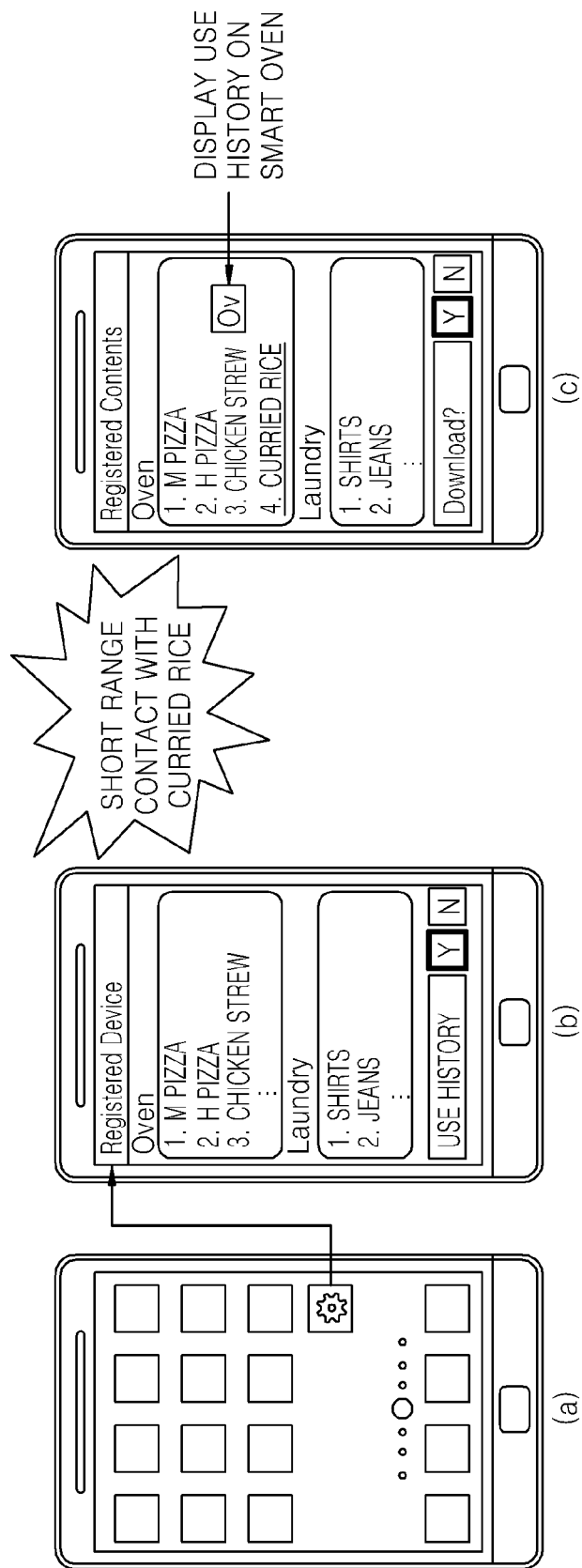
FIG. 21 is a diagram for describing a mobile terminal distinguishing and displaying a product that has a control history, according to an exemplary embodiment.

FIG. 21 is a diagram for describing the mobile terminal 1000 distinguishing and displaying a product that has a control history, according to an exemplary embodiment.

As shown in FIG. 21 (*a*), a predetermined application selected based on a user input may be executed. Also, as shown in FIG. 21 (*b*), a product list may be displayed according to devices. Then, when the mobile terminal 1000 is within communication range of the curried rice, the curried rice may be added to the product list, as shown in FIG. 21 (*c*). Also, when control information of an oven for cooking the curried rice is stored in the mobile terminal 1000, information about a control history of the curried rice may be displayed in the product list.

The exemplary embodiments and all functional operations described above may be implemented using a digital electronic circuit or computer software, firmware, or hardware including the structure or an equivalent structure described herein, or by using a combination thereof.

A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

While the present disclosure has been particularly shown and described with reference to exemplary embodiments thereof, it will be understood by those of ordinary skill in the art that various changes in form and details may be made therein without departing from the spirit and scope of the present invention as defined by the following claims. Hence, it will be understood that the exemplary embodiments described above are not limiting invention. For example, each component described in a single type may be executed in a distributed manner, and components described distributed may also be executed in an integrated form.

The scope of the present invention is indicated by the claims rather than by the detailed description of the invention, and it should be understood that the claims and all modifications or modified forms drawn from the concept of the claims are included in the scope of the present invention.

What is claimed is:

1. A system for controlling an electronic appliance through a mobile terminal, the system comprising:
   a server comprising:
      a processor configured to obtain a command that controls the electronic appliance to perform a process on a product, based on device information of the electronic appliance and product information of the product which are transmitted from the mobile terminal; and
      a communication interface configured to transmit the command to the mobile terminal; and
   the mobile terminal comprising:
      a communication interface configured to receive the device information of the electronic appliance from the electronic appliance, receive the product information of the product from the product using near field communication (NFC) between the mobile terminal and the product, and transmit the device information and the product information to the server; and
      a processor configured to provide the command to the electronic appliance for causing the electronic appliance to perform the process on the product,
   wherein the device information comprises at least one of an identifier of the electronic appliance and an operational capability of the electronic appliance, and the product information comprises at least one of an identifier of the product, processing information for the product, and a property of the product,
   wherein the processor of the server provides the command to the mobile terminal as extensible markup language (XML) formatted data, and
   wherein the processor of the mobile terminal converts the command from XML format to NFC format.

2. A system for controlling an electronic appliance through a mobile terminal, the system comprising:
   a server comprising:
      a processor configured to obtain a command that controls the electronic appliance to perform a process on a product, based on device information of the electronic appliance and product information of the product which are transmitted from the mobile terminal; and
      a communication interface configured to transmit the command to the mobile terminal; and
   the mobile terminal comprising:
      a communication interface configured to receive the device information of the electronic appliance from the electronic appliance, receive the product information of the product from the product using near field communication (NFC) between the mobile terminal and the product, and transmit the device information and the product information to the server; and
      a processor configured to provide the command to the electronic appliance for causing the electronic appliance to perform the process on the product,
   wherein the device information comprises at least one of an identifier of the electronic appliance and an operational capability of the electronic appliance, and the product information comprises at least one of an identifier of the product, processing information for the product, and a property of the product,
   wherein the electronic appliance comprises a first electronic device and a second electronic device,
   wherein the communication interface of the mobile terminal receives first device information of the first electronic device, and receives second device information of the second electronic device, and
   wherein the processor of the mobile terminal selects one of the first electronic device and the second electronic device as a selected electronic device based on the first device information, the second device information, and the product information, and selects one of the first device information and the second device information of the selected electronic device as the device information.

3. A system for controlling an electronic appliance through a mobile terminal, the system comprising:
   a server comprising:
      a processor configured to obtain a command that controls the electronic appliance to perform a process on a product, based on device information of the electronic appliance and product information of the product which are transmitted from the mobile terminal; and
      a communication interface configured to transmit the command to the mobile terminal; and
   the mobile terminal comprising:
      a communication interface configured to receive the device information of the electronic appliance from the electronic appliance, receive the product information of the product from the product using near field communication (NFC) between the mobile terminal and the product, and transmit the device information and the product information to the server; and
      a processor configured to provide the command to the electronic appliance for causing the electronic appliance to perform the process on the product,
   wherein the device information comprises at least one of an identifier of the electronic appliance and an operational capability of the electronic appliance, and the product information comprises at least one of an identifier of the product, processing information for the product, and a property of the product,
   wherein the electronic appliance comprises a first electronic device and a second electronic device,
   wherein the communication interface comprised in the mobile terminal receives first device information of the first electronic device, and receives second device information of the second electronic device,
   wherein the mobile terminal further comprises:

a display configured to display a list of the first electronic device and the second electronic device; and an input interface configured to receive an input selecting one of the first electronic device and the second electronic device in the list as the selected electronic device, and wherein the processor of the mobile terminal selects one of the first device information and the second device information of the selected electronic device as the device information.

4. A system for controlling an electronic appliance through a mobile terminal, the system comprising:

a server comprising:
a processor configured to obtain a command that controls the electronic appliance to perform a process on a product, based on device information of the electronic appliance and product information of the product which are transmitted from the mobile terminal; and
a communication interface configured to transmit the command to the mobile terminal; and the mobile terminal comprising:
a communication interface configured to receive the device information of the electronic appliance from the electronic appliance, receive the product information of the product from the product using near field communication (NFC) between the mobile terminal and the product, and transmit the device information and the product information to the server; and
a processor configured to provide the command to the electronic appliance for causing the electronic appliance to perform the process on the product, wherein the device information comprises at least one of an identifier of the electronic appliance and an operational capability of the electronic appliance, and the product information comprises at least one of an identifier of the product, processing information for the product, and a property of the product, wherein the product comprises a first product and a second product, wherein the communication interface of the mobile terminal receives first product information of the first product, and receives second product information of the second product, and wherein the processor of the mobile terminal selects one of the first product and the second product as a selected product based on the first product information, the second product information, and the device information, and selects one of the first product information and the second product information of the selected product as the product information.

5. A system for controlling an electronic appliance through a mobile terminal, the system comprising:

a server comprising:
a processor configured to obtain a command that controls the electronic appliance to perform a process on a product, based on device information of the electronic appliance and product information of the product which are transmitted from the mobile terminal; and
a communication interface configured to transmit the command to the mobile terminal; and the mobile terminal comprising:
a communication interface configured to receive the device information of the electronic appliance from the electronic appliance, receive the product information of the product from the product using near field communication (NFC) between the mobile terminal and the product, and transmit the device information and the product information to the server; and
a processor configured to provide the command to the electronic appliance for causing the electronic appliance to perform the process on the product, wherein the device information comprises at least one of an identifier of the electronic appliance and an operational capability of the electronic appliance, and the product information comprises at least one of an identifier of the product, processing information for the product, and a property of the product, wherein the product comprises a first product and a second product, wherein the communication interface comprised in the mobile terminal receives first product information of the first product, and receives second product information of the second product, and the mobile terminal further comprises:
a display configured to display a list of the first product and the second product; and
an input interface configured to receive an input selecting one of the first product and the second product in the list as the selected product, and wherein the processor of the mobile terminal selects one of the first product information and the second product information of the selected product as the product information.

* * * * *